(12) United States Patent
Moriguchi et al.

(10) Patent No.: US 9,396,250 B2
(45) Date of Patent: Jul. 19, 2016

(54) FLOW LINE DETECTION PROCESS DATA DISTRIBUTION SYSTEM, FLOW LINE DETECTION PROCESS DATA DISTRIBUTION METHOD, AND PROGRAM

(75) Inventors: Yukie Moriguchi, Minato-ku (JP); Yuusuke Konishi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 368 days.

(21) Appl. No.: 13/977,827

(22) PCT Filed: Jan. 16, 2012

(86) PCT No.: PCT/JP2012/000219
§ 371 (c)(1),
(2), (4) Date: Jul. 1, 2013

(87) PCT Pub. No.: WO2012/098853
PCT Pub. Date: Jul. 26, 2012

(65) Prior Publication Data
US 2013/0290336 A1     Oct. 31, 2013

(30) Foreign Application Priority Data
Jan. 20, 2011   (JP) ................. 2011-009836

(51) Int. Cl.
*G06F 17/30* (2006.01)
*G06T 7/20* (2006.01)
*G06K 9/00* (2006.01)

(52) U.S. Cl.
CPC ...... *G06F 17/30598* (2013.01); *G06K 9/00778* (2013.01); *G06T 7/2006* (2013.01); *G06T 2207/10016* (2013.01); *G06T 2207/30196* (2013.01); *G06T 2207/30241* (2013.01)

(58) Field of Classification Search
CPC ........... G06T 2207/10016; G06T 2207/30196; G06T 2207/30241; G06T 7/2006; G06F 17/30598; G06K 9/00778
USPC ......................................... 707/737
See application file for complete search history.

(56) References Cited

U.S. PATENT DOCUMENTS 7,362,219 B2 *   4/2008  Nogami et al. .............. 340/505
7,852,217 B2 * 12/2010  Kondo et al. ............. 340/572.1
(Continued)

FOREIGN PATENT DOCUMENTS

| JP | 2000-40079 A | 2/2000 |
| JP | 2008-52531 A | 3/2008 |

(Continued)

*Primary Examiner* — Rehana Perveen
*Assistant Examiner* — Tiffany Thuy Bui
(74) *Attorney, Agent, or Firm* — Sughrue Mion, PLLC

(57) ABSTRACT

There is provided a flow line detection process data distribution system which can distribute data detected from a mobile body to precisely perform flow line detection when flow line detection is realized by distribution processing. An area processing means 92 calculates for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determines the divided areas obtained by dividing the predetermined area based on the calculated degree of correlation. A data distribution means 93 classifies the sensor data stored in the data storage means 91 depending on in which divided area the sensor data is detected, and outputs the classified sensor data to different flow line detection process units.

9 Claims, 19 Drawing Sheets

(56) References Cited

U.S. PATENT DOCUMENTS

| | | | |
|---|---|---|---|
| 8,909,497 B1* | 12/2014 | Shkolnikov | 702/141 |
| 2004/0164858 A1* | 8/2004 | Lin | 340/522 |
| 2005/0128293 A1* | 6/2005 | Wilsey et al. | 348/143 |
| 2007/0182818 A1* | 8/2007 | Buehler | 348/143 |
| 2009/0003653 A1* | 1/2009 | Takahata et al. | 382/103 |
| 2009/0164284 A1 | 6/2009 | Koiso et al. | |
| 2009/0195388 A1 | 8/2009 | Ikumi et al. | |
| 2011/0013837 A1* | 1/2011 | Bergman et al. | 382/173 |

FOREIGN PATENT DOCUMENTS

| | | |
|---|---|---|
| JP | 2009-187217 A | 8/2009 |
| JP | 2010-124382 A | 6/2010 |
| WO | 2009/022678 A1 | 2/2009 |

* cited by examiner

FIG. 4

|     | a1 | a2 | a3 | a4 |
|-----|----|----|----|----|
| a1  |    | 2  | 7  | 1  |
| a2  |    |    | 1  | 7  |
| a3  |    |    |    | 2  |
| a4  |    |    |    |    |

FIG. 5
(a) 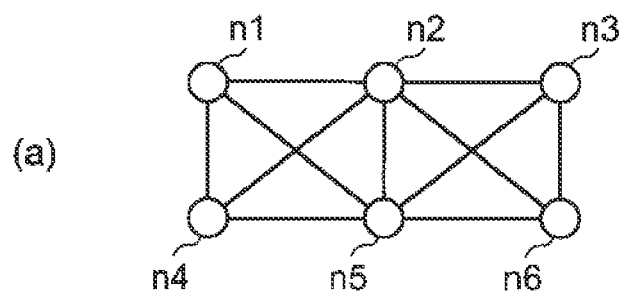
(b) 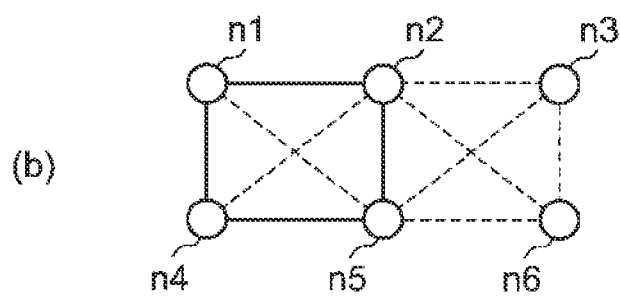
(c) 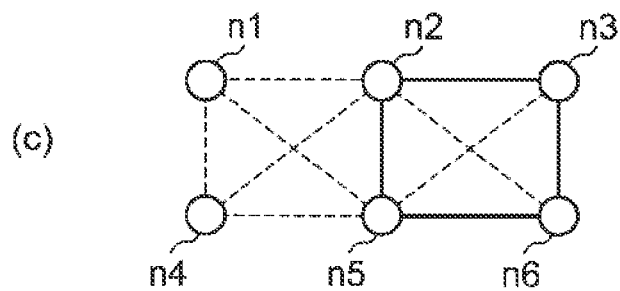

FIG. 7

| IDENTIFICATION INFORMATION OF MOBILE BODY ID DETECTION APPARATUS (IDENTIFICATION NUMBER) | INSTALLATION POSITION COORDINATE |
|---|---|
| r1 | 100,50 |
| r2 | 300,50 |
| r3 | 50,150 |
| r4 | 300,150 |

FIG. 8

| TRACE AREA VERTEX | POSITION COORDINATE |
|---|---|
| v1 | 0,0 |
| v2 | 400,0 |
| v3 | 400,200 |
| v4 | 0,200 |

FIG. 10

| DETECTION TIME | MOBILE BODY ID | IDENTIFICATION NUMBER OF MOBILE BODY ID DETECTION APPARATUS | UNIT AREA TO WHICH MOBILE BODY ID DETECTION APPARATUS BELONGS | DEGREE OF CORRELATION |
|---|---|---|---|---|
| t1 | u1 | r1 | a1 | |
| t2 | u1 | r2 | a2 | ADD 1 TO DEGREE OF CORRELATION BETWEEN a1 AND a2 |
| t3 | u2 | r3 | a3 | |
| t4 | u1 | r1 | a1 | ADD 1 TO DEGREE OF CORRELATION BETWEEN a1 AND a2 |
| t5 | u2 | r1 | a1 | ADD 1 TO DEGREE OF CORRELATION BETWEEN a1 AND a3 |

FLOW LINE DETECTION PROCESS DATA DISTRIBUTION SYSTEM, FLOW LINE DETECTION PROCESS DATA DISTRIBUTION METHOD, AND PROGRAM

CROSS REFERENCE TO RELATED APPLICATIONS

This application is a National Stage of International Application No. PCT/JP2012/000219 filed Jan. 16, 2012, claiming priority based on Japanese Patent Application No. 2011-009836 filed Jan. 20, 2011, the contents of all of which are incorporated herein by reference in their entirety.

TECHNICAL FIELD

The present invention relates to a flow line detection process data distribution system, a flow line detection process data distribution method, and a flow line detection process data distribution program which, when a plurality of calculators performs parallel distribution processing of flow line detection processing, distributes data used for the flow line detection processing to each calculator.

BACKGROUND ART

Generally, flow line detection of a mobile body such as a person or an object is realized by associating a position of the mobile body (trajectory) and an ID (identification information) of the mobile body. This association makes it possible to uniquely identify the mobile body and detect a flow line.

Further, various techniques related to distribution processing are proposed (see, for example, Patent Literatures 1 and 2).

Patent Literature 1 discloses a load distribution method targeting at a capture apparatus which performs a plurality of types of analysis processing of data sent in a network. The load distribution method disclosed in Patent Literature 1 includes: an actual load measurement step of measuring an actual load amount by analysis processing per capture apparatus; a load amount update step of updating information of the actual load amount per measurement, and updating information of a predicted load amount of analysis processing to be executed next, based on the information of the actual load amount; a required time measurement step of measuring a required time required for each analysis processing; a processing frequency calculation step of calculating a processing frequency which indicates a degree of each analysis processing in a time slot for each analysis processing; a target load amount calculation step of calculating a target load amount of each analysis processing allocated to one capture apparatus based on the information of the required time and the information of the processing frequency; and an analysis processing allocation step of, when the actual load amount in this one capture apparatus is higher than a predicted load amount in another capture apparatus, allocating part of analysis processing to be allocated to this one capture apparatus as analysis processing of another capture apparatus, based on the information of the predicted load amount in another capture apparatus and information of the calculated target load amount.

Thus, the load distribution method disclosed in Patent Literature 1 distributes a load by predicting a load amount of analysis processing to be performed next, based on a current load amount in each capture apparatus and, when an actual load amount in a given capture apparatus is higher than a predicted load amount of another capture apparatus, allocating part of analysis processing of the capture apparatus of the higher actual load amount to another capture apparatus of the lower predicted load amount. That is, the analysis processing is distributed using the actual load amount and the predicted load amount as indices.

Further, Patent Literature 2 discloses a parallel data analysis apparatus which targets at analyzing data including a plurality of fields (for example, the sex and the age of clients) such as sales content of a retailer and a use history of a credit card. The parallel data analysis apparatus disclosed in Patent Literature 2 has: a field selection means which selects one or more fields which are not analysis targets per processing apparatus from base fields of a plurality of fields to be commonly allocated to each processing apparatus; a field deletion means which deletes data which belongs to the fields selected by the field selection means per processing apparatus from data which belongs to the base fields; a data analysis means which analyzes data which belongs to the base fields and the deleted data per processing apparatus, and creates a prediction model; a data prediction means which predicts data of a prediction target field based on the prediction model; and a prediction model selection means which compares prediction results and uses a prediction model of the highest analysis precision as a prediction value.

Thus, the parallel data analysis apparatus disclosed in Patent Literature 2 excludes one or more fields from a plurality of fields to be allocated per parallelized processing apparatus, analyzes the field using the excluded data and selects an analysis result of the highest precision. That is, the parallel data analysis apparatus uses a field which configures data to distribute input information to each processing apparatus. Further, although data analysis procedure includes supervised learning and unsupervised learning, in case of supervised learning, the degree of data association between fields is calculated, so that field data of a high degree of association can be processed by an identical processing apparatus.

CITATION LIST

Patent Literature

PLT1: Japanese Patent Application Laid-Open No. 2010-124382
PLT2: Japanese Patent Application Laid-Open No. 2000-40079

SUMMARY OF INVENTION

Technical Problem

When flow line detection processing targeting at multiple mobile bodies which exist in a wide range is performed, the number of combinations of mobile body positions and mobile body IDs remarkably increases, and therefore it is difficult in some cases to realize flow line detection processing of associating mobile body positions and mobile body IDs by one computation unit. Hence, a plurality of computation units which performs flow line detection processing may be used to distribute to each computation unit the mobile body position data and the mobile body ID data used for flow line detection processing and perform flow line detection by distribution processing.

Further, to realize this distribution processing, the technique disclosed in Patent Literature 1 and the technique disclosed in Patent Literature 2 may be applied.

When the mobile body position data and the mobile body ID data are distributed to each computation unit, if the technique disclosed in Patent Literature 1 is applied, flow line detection precision lowers depending on a method of classifying data to each computation unit. While the technique disclosed in Patent Literature 1 realizes distribution of analysis processing based on actual load amounts and predicted load amounts in individual apparatuses, and distributing data to improve analysis precision is not taken into account. An example will be described below where flow line detection precision changes depending on how data is distributed.

FIG. 22 is a schematic view illustrating an example of an ID and trajectories of a mobile body detected in a trace area. In a trace area 200, three trajectories 211, 212 and 213 are detected as mobile body trajectories. Further, in the trace area 200, two mobile body ID detection areas 201 and 202 are fixed as areas from which mobile body IDs are detected. Furthermore, mobile body IDs "a" and "b" are detected from the mobile body ID detection area 201, and mobile body IDs "a" and "c" are detected from the mobile body ID detection area 202. These detected trajectories 211 to 213 and the mobile body IDs "a" to "c" are distributed to two computation units. FIGS. 23 and 24 are schematic views illustrating how to distribute detected data.

As illustrated in FIG. 23, two areas 203 and 204 obtained by dividing the trace area 200 in a vertical direction by two are fixed, the trajectory and the mobile body ID detected in the area 203 are inputted to one computation unit, and the trajectory and the mobile body ID detected in the area 204 are inputted to another computation unit to have each computation unit perform flow line detection processing. In this case, the trajectories 211 and 212 and the mobile body IDs "a" and "b" are detected in the area 203, and one computation unit performs flow line detection using these trajectories and the mobile body IDs. Further, the trajectories 211 and 213 and the mobile body IDs "a" and "c" are detected in the area 204, and another computation unit performs flow line detection using these data. Although, when flow line detection processing of the data detected in the area 203 is performed, the trajectories 211 and 212 and the mobile body IDs "a" and "b" are associated, it is not possible to decide which trajectory should be associated with which mobile body ID, based only on the data detected in the area 203. Although, when flow line detection processing of the data detected in the area 204 is performed, the trajectories 211 and 213 and the mobile body IDs "a" and "c" are also associated, it is not possible to decide which trajectory should be associated with which mobile body ID, based only on the data detected in the area 204.

Meanwhile, as illustrated in FIG. 24, two areas 205 and 206 obtained by dividing the trace area 200 in a horizontal direction by two are fixed, the trajectory and the mobile body ID detected in the area 205 are inputted to one computation unit, and the trajectory and the mobile body ID detected in the area 206 are inputted to another computation unit to have each computation unit perform flow line detection processing.

In this case, trajectories 211 and 212 are detected in the area 205. Further, the mobile body ID "a" is detected in the two mobile body ID detection areas 201 and 202 which overlap the area 205. The mobile body ID "b" is detected in the mobile body ID detection area 201 which overlaps the area 205. The mobile body ID "c" is detected in the mobile body ID detection area 202 which overlaps the area 205. One computation unit performs flow line detection using these trajectories and mobile body IDs. This computation unit can decide that associating the trajectory 211 and the mobile body ID "a" detected across the mobile body ID detection areas 201 and 202 and associating the trajectory 212 and the mobile body ID "b" detected in the mobile body ID detection area 201 are likely, and performs association in such a way.

A trajectory 213 is detected in the area 206. Further, the mobile body ID "a" is detected in the two mobile body ID detection areas 201 and 202 which overlap the area 206. The mobile body ID "b" is detected in the mobile body ID detection area 201 which overlaps the area 206. The mobile body ID "c" is detected in the mobile body ID detection area 202 which overlaps the area 206. Another computation unit performs flow line detection using these trajectories and mobile body IDs. Although the trajectory 213 detected in the mobile body ID detection area 202 is likely to be associated with the mobile body ID "a" or "c" detected in this mobile body ID detection area 202, the mobile body ID "a" is detected in the mobile body ID detection area 201, too, so that this computation unit can decide that associating the trajectory 213 detected only in the mobile body ID detection area 202 and the mobile body ID "c" is likely, and performs association in such a way.

As is clear upon comparison of the example described with reference to FIG. 23 and the example described with reference to FIG. 24, although flow line detection precision of a computation unit varies depending on how data is distributed, the technique disclosed in Patent Literature 1 cannot not perform distribution processing while taking into account such analysis precision. Hence, when the technique disclosed in Patent Literature 1 is applied to distribute data used to perform flow line detection processing, a decrease in flow line detection precision is likely to occur.

Further, when mobile body position data and mobile body ID data are distributed to each computation unit, if the technique disclosed in Patent Literature 2 is applied, a computation unit has difficulty in performing flow line detection processing. The technique disclosed in Patent Literature 2 determines which computation unit analyzes which field of data based on a field of the data in order to take analysis precision into account. As to a data analysis problem which the technique disclosed in Patent Literature 2 targets at, even when part of a field of data is deficient, the field can be processed. However, in the flow line detection processing, mobile body position information and a mobile body ID are associated, and therefore both of the mobile body position information and the mobile body ID are required. Further, when one of the mobile body position information and the mobile body ID is deleted or when part of information included in the position information or the ID is deleted, flow line detection processing cannot be performed. Hence, it is difficult to apply the technique disclosed in Patent Literature 2 which deletes part of data per computation unit to distribution processing of flow line detection.

It is therefore an object of the present invention to provide a flow line detection process data distribution system, a flow line detection process data distribution method and a flow line detection process data distribution program which can distribute data detected from a mobile body to precisely perform flow line detection.

Solution to Problem

A flow line detection process data distribution system according to the present invention has: a data storage means which stores sensor data of a past certain period of time since an input of latest sensor data among sensor data which is data detected in a predetermined area in which a mobile body moves and related to a mobile body; an area processing means which calculates for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determines the divided areas obtained by dividing the predetermined area based on the calculated degree of correlation; and a data distribution means which classifies the sensor data stored in the data storage means depending on in which divided area the sensor data is detected, and outputs the classified sensor data to different flow line detection process units.

Further, a flow line detection process data distribution method according to the present invention includes: at a data storage means, storing sensor data of a past certain period of time since an input of latest sensor data among sensor data which is data detected in a predetermined area in which a mobile body moves and related to a mobile body; at an area processing means, calculating for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determining the divided areas obtained by dividing the predetermined area based on the calculated degree of correlation; and at a data distribution means, classifying the sensor data stored in the data storage means depending on in which divided area the sensor data is detected, and outputting the classified sensor data to different flow line detection process units.

Furthermore, a flow line detection process data distribution program according to the present invention causes a computer to execute: data storage processing of storing sensor data of a past certain period of time since an input of latest sensor data among sensor data which is data detected in a predetermined area in which a mobile body moves and related to a mobile body; area processing of calculating for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determining the divided areas obtained by dividing the predetermined area based on the calculated degree of correlation; and data distribution processing of classifying the sensor data stored in the data storage processing depending on in which divided area the sensor data is detected, and outputting the classified sensor data to different flow line detection process units.

Advantageous Effects of Invention

The present invention can distribute data detected from a mobile body to precisely perform flow line detection when flow line detection is realized by distribution processing.

BRIEF DESCRIPTION OF DRAWINGS

[FIG. 4] It depicts a view illustrating an example of the degree of correlation calculated per combination of unit areas.

[FIG. 5] It depicts an explanatory view illustrating an example of a divided graph which is a divided graph obtained from an identical graph and includes a common node.

[FIG. 7] It depicts an explanatory view illustrating an example of a correspondence table which indicates a correspondence between identification information and an installation position coordinate of each mobile body ID detection apparatus.

[FIG. 8] It depicts an explanatory view illustrating an example of information indicating a range of a trace area 50.

[FIG. 10] It depicts an explanatory view illustrating a calculation example of the degree of correlation.

DESCRIPTION OF EMBODIMENTS

Hereinafter, exemplary embodiments of the present invention will be described with reference to the drawings.

First Exemplary Embodiment

Figure 1:
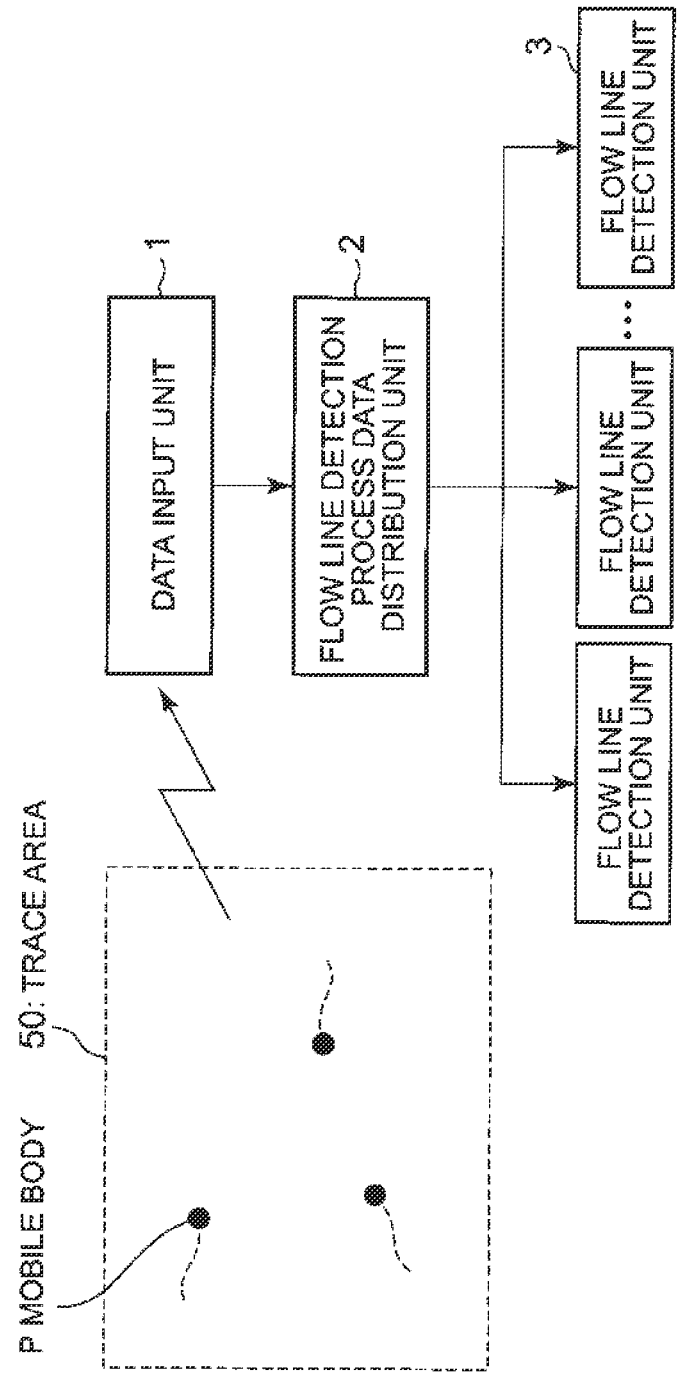
[FIG. 1] It depicts a block diagram illustrating a first exemplary embodiment of a flow line detection process data distribution system according to the present invention.

FIG. 1 depicts a block diagram illustrating a first exemplary embodiment of a flow line detection process data distribution system according to the present invention. A flow line detection process data distribution system according to the present invention has a data input unit 1 and a flow line detection process data distribution unit 2. Further, the flow line detection process data distribution unit 2 is connected with a plurality of flow line detection units 3. The flow line detection process data distribution system may have each flow line detection unit 3.

The flow line detection process data distribution system according to the present invention obtains as input data a great amount of data detected from a mobile body P which exists in a trace area 50. More specifically, the flow line detection process data distribution system obtains trajectory information which is information related to a mobile body trajectory, and mobile body ID information which is information related to a mobile body ID. Hereinafter, the trajectory information and the mobile body ID information are also referred to as sensor data. The trace area 50 may be a wide range area, and the number of mobile bodies P in the trace area 50 may be multiple. Further, sensor data obtained as input data by the flow line detection process data distribution system may be a great amount. The flow line detection process data distribution system according to the present invention calculates for a combination of unit areas belonging to the trace area 50 the degree of correlation which indicates a degree that sensor data related to an identical mobile body is detected. Further, the flow line detection process data distribution system determines divided areas obtained by dividing the trace area 50 based on the degrees of correlation calculated for the combinations of unit areas, and distributes the detected sensor data to the respective flow line detection units 3 per divided area. In addition, the unit areas will be described below.

As a result, each flow line detection unit 3 receives an input of only sensor data for which flow line detection processing can be performed, and can prevent a processing load from increasing when deciding at which position in the trace range 50 each mobile body exists (in other words, when a mobile body ID and a trajectory are associated) using this sensor data (trajectory information and mobile body ID information) and increase decision precision.

The trace range 50 is determined in advance. The mobile body P freely moves in the trace range 50. Further, the mobile body P may go outside the trace area 50. The type of the mobile body P is not limited in particular, and may be a person, an animal or an object.

The data input unit 1 is an apparatus which detects trajectory information and mobile body ID information of a mobile body in the trace area 50, and inputs the trajectory information and the mobile body ID information to the flow line detection process distribution unit 2. The trajectory information includes a trajectory ID which is an ID for uniquely identifying trajectory information, and a list of position coordinates of the mobile body and detection times of the position coordinates. Further, the mobile body ID information includes a mobile body ID which is an ID of the detected mobile body, a detection position coordinate of the mobile body ID and a detection time of this mobile body ID. Thus, in the description of the present invention, the "mobile body ID information" and the "mobile body ID" are distinguished. The "mobile body ID" is an ID of a mobile body itself, and the "mobile body ID information" is information which includes a mobile body ID, detection position coordinates of the mobile body ID and detection times.

The data input unit 1 is realized by, for example, an apparatus (referred to as a "trajectory information detection apparatus" below) which detects trajectory information and an apparatus (referred to as a "mobile body ID information detection apparatus") which detects mobile body ID information. Further, the data input unit 1 may be configured such that an identical apparatus detects the trajectory information and the mobile body ID information. Furthermore, a plurality of trajectory information detection apparatuses and mobile body ID information detection apparatuses may be provided.

A detection position coordinate of a mobile body ID only needs to decide at which position in the trace area 50 the mobile body ID is detected, and may be, for example, a two-dimensional coordinate. Alternatively, when a plurality of mobile body ID information detection apparatuses which is used as part of the data input unit 1 is installed in the trace area 50, an ID (for example, an apparatus number) of a mobile body ID information detection apparatus which detects mobile body ID information as a detection position coordinate included in the mobile body ID information may be used. In this case, by storing in the flow line detection process data distribution unit 2 a correspondence table which indicates a correspondence between the ID of the mobile body ID information detection apparatus and an installation position of the mobile body ID information detection apparatus, and referring to this correspondence table, a detection position of the mobile body ID may be specified based on the ID of the mobile body ID information detection apparatus included in the mobile body ID information. In addition, in this case, the installation position of the mobile body ID information detection apparatus is regarded as a detection position of the mobile body ID.

The trajectory information detection apparatus only needs to be an apparatus which can detect a position coordinate of a mobile body in the trace area 50, and specify a detection time. The trajectory information detection apparatus may be realized by a mobile body trace system which uses, for example, a camera, a floor pressure sensor, a laser range finder or a laser. When the trajectory information detection apparatus is realized in this mode, a mobile body may not have a device which is necessary for the mobile body to be detected. Further, the trajectory information detection apparatus may detect a position coordinate of a mobile body in a mode in which a device required to detect a coordinate is provided in a mobile body. For example, the trajectory information detection apparatus may be realize by, for example, a wireless communication device such as a GPS (Global Positioning System) and a mobile body trace system which uses an ultrasonic wave transmitter/receiver.

Further, when detecting a position coordinate of a mobile body which is decided to newly appear, the trajectory information detection apparatus newly allocates a trajectory ID, associates this trajectory ID, the detected position coordinate and a detection time of this position coordinate, and newly generates trajectory information. Subsequently, the trajectory information detection apparatus continues to detect the position coordinate of this mobile body, and adds the position coordinate of the mobile body and the detection time of this position coordinate to this trajectory information. As a result, the trajectory information includes a trajectory ID and a list of position coordinates and detection times of the position coordinates. A position coordinate group included in this list represents a trajectory of a mobile body. Further, when the position coordinate of the mobile body cannot be detected, adding position coordinates and detection times to this trajectory information is stopped. When a position coordinate of a mobile body which is decided to newly appear is detected again, the trajectory information detection apparatus newly allocates a trajectory ID and generates new trajectory information.

Further, although trajectory information can be desirably detected from the entire trace area 50 without a blind area, an area which becomes a blind area in which the trajectory information cannot be detected may partially exist. When trajectory information breaks up halfway due to a blind area and a trajectory of one mobile body is divided into a plurality of pieces of trajectory information of different trajectory IDs, the flow line detection unit 3 can specify a string of flow lines by associating each mobile body ID and each trajectory information.

A mobile body ID information detection apparatus only needs to be an apparatus which can detect a mobile body ID unique to each mobile body in the trace area 50, and specify a coordinate of a position at which the mobile body ID is detected and a detection time of the coordinate. When, for example, a mobile body has an active RFID (Radio Frequency IDentification) tag and uses this tag ID as a mobile body ID, an RFID reader only needs to be used as a mobile body ID information detection apparatus. Further, when a mobile body has an IC card and uses identification information of this IC card as a mobile body ID, an IC card reader only needs to be used as a mobile body ID information detection apparatus. Furthermore, when a mobile body has a wireless LAN (Local Area Network) terminal and uses a MAC address (Media Access Control address) of this wireless LAN terminal as a mobile body ID, an access point only needs to be used as a mobile body ID information detection apparatus. Still further, when a unique bar code is printed per mobile body, a bar code reader only needs to be used as a mobile body ID information detection apparatus. Moreover, when a mobile body is a person, the face, finger prints and veins of a person may be used as a mobile body ID of the person, and an apparatus which reads these mobile body IDs only needs to be used as a mobile body ID information detection apparatus. Further, like a face recognition apparatus and an RFID reader, mobile body ID information detection apparatuses of different detection targets may be used in combination.

Meanwhile, whether or not a mobile body ID can be detected varies depending on a mobile body position in the trace area 50. Hence, in the trace area 50, a mobile body ID cannot always be detected at a place at which the mobile body exists. When, for example, a mobile body exists near the mobile body ID information detection apparatus, a detection probability of a mobile body ID is high and, when a mobile body exists at a place far from the mobile body ID information detection apparatus, a detection probability of a mobile body ID is low.

Further, when a plurality of mobile body ID information detection apparatuses is installed in the trace area 50, each mobile body ID information detection apparatus may be installed such that ranges in which mobile body IDs can be detected overlap each other or may be installed such that the ranges do not overlap each other.

When generating trajectory information, the trajectory information detection apparatus belonging to the data input unit 1 inputs this trajectory information to the flow line detection process data distribution unit 2. When detection of a position coordinate of a mobile body breaks up halfway, the trajectory information detection apparatus may input trajectory information to the flow line detection process data distribution unit 2. Alternatively, at a point of time at which a trajectory ID is allocated first, the trajectory information may be inputted to the flow line detection process data distribution unit 2, then the position coordinate and the detection time may be inputted to the flow line detection process data distribution 2 every time a position coordinate of the same mobile body is detected, and the trajectory information may be added.

Further, the mobile body ID information detection apparatus belonging to the data input unit 1 combines the detected mobile body ID, the detection position coordinate and the detection time as mobile body ID information, and inputs the mobile body ID information to the flow line detection process data distribution unit 2. When trying to detect a mobile body ID and failing detection of the mobile body ID, the mobile body ID information detection apparatus may input "none" of a mobile body ID, a detection position coordinate (such as an installation position coordinate of the mobile body ID information detection apparatus) and the detection time to the flow line detection process data distribution unit 2. Further, if the mobile body ID information detection apparatus does not input mobile body ID information to the flow line detection process data distribution unit 2, the flow line detection process data distribution unit 2 may decide that no mobile body ID is detected at this time.

Meanwhile, although a case has been described as an example where the trajectory information detection apparatus and the mobile body ID information detection apparatus are provided as the data input unit 1, the trajectory information detection apparatus and the mobile body ID information detection apparatus may be realized by an identical apparatus as described above. In the following description, a case will be described as an example where the trajectory information detection apparatus and the mobile body ID information detection apparatus are provided as the data input unit 1.

Figure 2:
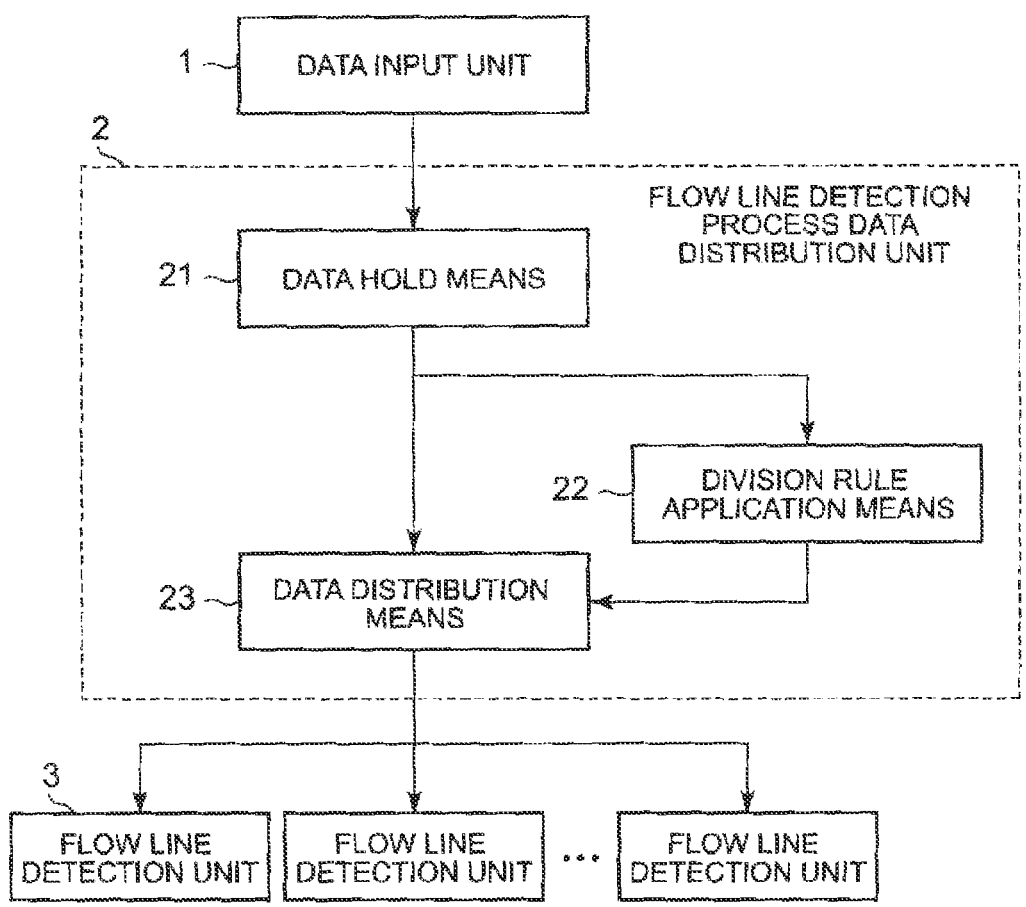
[FIG. 2] It depicts a block diagram illustrating a configuration example of a flow line detection process data distribution unit 2 according to the first exemplary embodiment.

FIG. 2 depicts a block diagram illustrating a configuration example of the flow line detection process data distribution unit 2 according to the first exemplary embodiment. In addition, the data input unit 1 and the flow line detection unit 3 are also illustrated. The flow line detection process data distribution unit 2 has a data hold means 21, a division rule application means 22 and a data distribution means 23.

The data hold means 21 holds sensor data (that is, trajectory information and mobile body ID information) inputted from the data input unit 1 of a past certain period of time from a current time. When receiving an input of the trajectory information and the mobile body ID information from the data input unit 1, the data hold means 21 adds newly inputted trajectory information and mobile body ID information as sensor data to be held, deletes old sensor data of a past certain period of time or before from the current time and updates sensor data. Meanwhile, the "current time" is a latest time at which sensor data is inputted from the data input unit 1. The data hold means 21 inputs the updated sensor data to the division rule application means 22 and the data distribution means 23. In addition, instead of inputting sensor data from the data hold means 21 to the division rule application means 22 and the data distribution means 23, the division rule application means 22 and the data distribution means 23 may read updated sensor data held in the data hold means 21.

The division rule application means 22 acquires the sensor data (trajectory information and mobile body ID information) of a past certain period of time from the current time from the data hold means 21, and divides the trace area 50 into divided areas according to a division rule using this sensor data. The division rule is a rule which defines an operation of the division rule application means 22 (more specifically, each means included in the division rule application means 22. See FIG. 3), and, in other words, may also be referred to as an algorithm of dividing the trace area 50 into divided areas. The division rule application means 22 calculates for a combination of unit areas belonging to the trace area 50 the degree of correlation which indicates a degree that sensor data related to an identical mobile body is detected, by using, for example, mobile body ID information among sensor data of a past certain period of time from the current time. Further, the flow line detection process data distribution system determines divided areas obtained by dividing the trace area 50 based on the degree of correlation calculated for the combination of unit areas.

The data distribution means 23 classifies the sensor data acquired from the data hold means 21 per divided area in which the sensor data is detected, and outputs the classified sensor data to the different flow line detection units 3.

Figure 3:
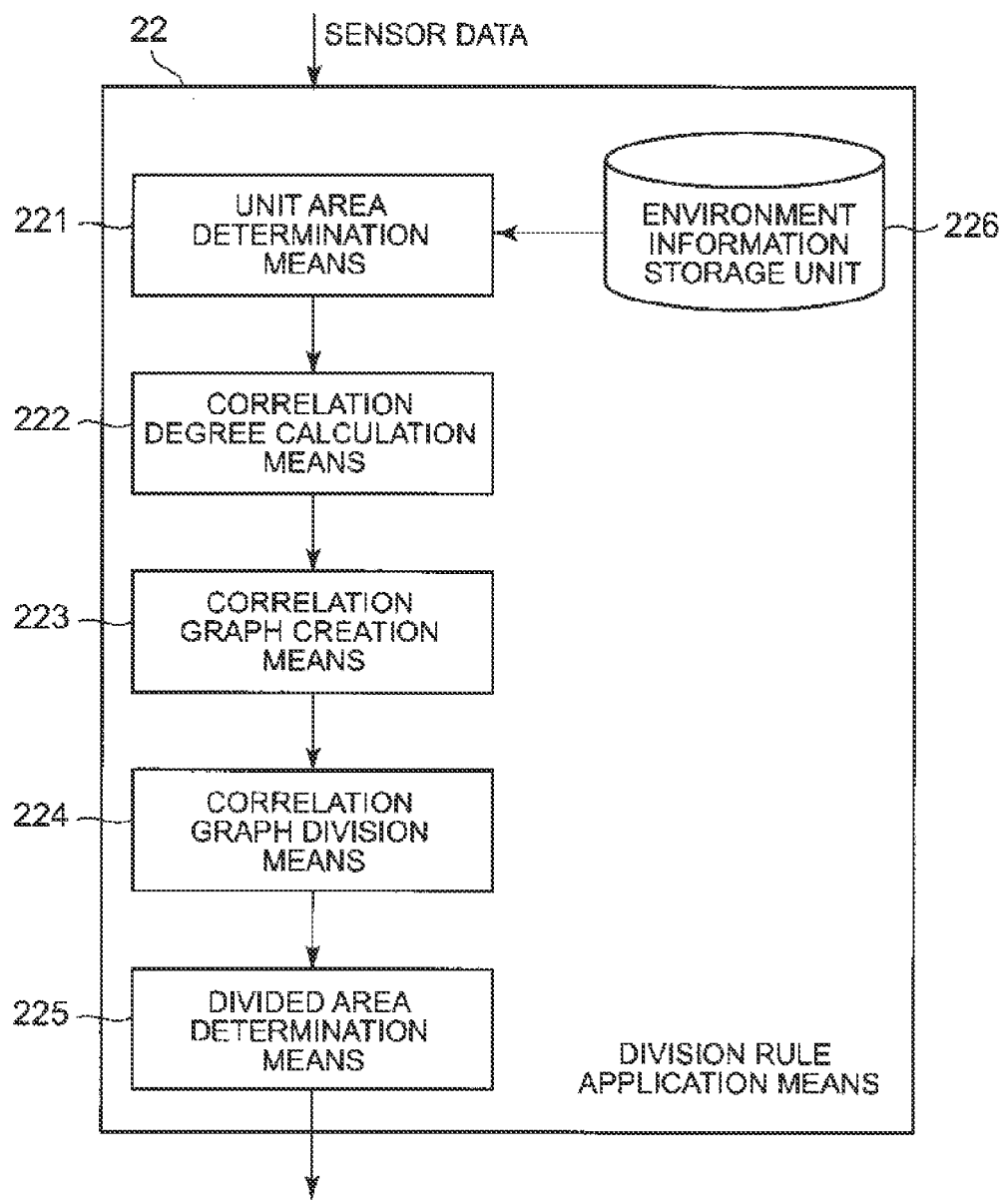
[FIG. 3] It depicts a block diagram illustrating a configuration example of a division rule applying means 22.

FIG. 3 depicts a block diagram illustrating a configuration example of the division rule applying means 22. The division rule application means 22 has an environment information storage unit 226, a unit area determination means 221, a correlation degree calculation means 222, a correlation graph creation means 223, a correlation graph division means 224 and a divided area determination means 225.

The environment information storage unit 226 is a storage apparatus which stores information (referred to as "unit area setting information" below) which defines unit areas in the trace area 50 or information for determining a unit area in the trace area 50. The unit area is an individual area obtained by dividing the trace area 50 such that a condition that at least one mobile body ID detection apparatus exists in an individual area is satisfied. The unit area is used as a constituent unit of the divided area which is a criterion to distribute sensor data of a past certain period of time from the current to the flow line detection unit 3. In addition, although one mobile body ID detection apparatus or a plurality of mobile body ID detection apparatuses may exist in one unit area, each unit area is determined such that the condition that at least one mobile body ID detection apparatus exists is satisfied.

Further, a unit area group which forms the trace area 50 may be determined in advance by a person based on the mobile body ID detection apparatus such that a condition that at least one mobile body ID detection apparatus exists in each unit area is satisfied, and a coordinate which defines each unit area and an ID of each unit area may be stored in the environment information storage unit 226 as unit area setting information. In this case, a correspondence between an individual unit area and a mobile body ID detection apparatus in each unit area may not be stored in the environment information storage unit 226.

Further, instead of manually determining unit areas, the unit area determination means 221 of the division rule application means 22 may determine the unit areas. In this case, the environment information storage unit 226 only needs to store as information for determining unit areas in the trace area 50 a correspondence table which indicates a correspondence between identification information and an installation position (for example, an installation position coordinate) of each mobile body ID detection apparatus installed in the trace area 50, and information which indicates a range of the trace area 50. Based on this correspondence table, the unit area determination means 221 only needs to determine each unit area from the entire trace area 50 such that a condition that at least one mobile body ID detection apparatus exists in each unit area. Further, the environment information storage unit 226 may store not only the correspondence table which indicates the correspondence between the identification information and the installation position of each mobile body ID detection apparatus but also a correspondence table which indicates the correspondence between identification information and an installation position of each trajectory information detection apparatus installed in the trace area 50.

A case will be described as an example below where the unit area determination means 221 determines unit areas.

The unit area determination means 221 divides the trace area 50 into unit areas based on the correspondence table which is stored in the environment information storage unit 226 and which indicates the correspondence between the identification information and the installation position of each mobile body ID detection apparatus. In this case, the trace area 50 only needs to be divided into a plurality of unit areas such that a condition that at least one mobile body ID detection apparatus exists in each unit area is satisfied. As long as this condition is satisfied, the size of each unit area may be fixed or different.

In addition, when unit area setting information is stored in advance in the environment information storage unit 226, the unit area determination means 221 only needs to read this setting information and output this setting information to the correlation degree calculation means 222. Alternatively, in this case, the correlation degree calculation means 222 may read unit area setting information from the environment information storage unit 226 without the unit area determination means 221.

The correlation degree calculation means 222 calculates for a combination of unit areas the degree of correlation which indicates the degree that sensor data related to an identical mobile body is detected by using mobile body ID information among sensor data of a past certain period of time from a current time acquired from the data hold means 21. The degree of correlation is a value which indicates the degree that the sensor data related to the identical mobile body is detected in the combination of unit areas, and therefore the "sensor data" described herein needs to be data which enables the identicalness of the mobile body to be decided and mobile body ID information is used. When trajectory information includes only a trajectory ID and a list of position coordinates of a mobile body and detection times of the position coordinates, the trajectory information alone has difficulty in enabling decision as to whether or not different trajectory information represents trajectories of the identical mobile body. However, when the trajectory information detection apparatus belonging to the data input unit 1 includes attribute information such as a color, a shape and a size of the mobile body, too in the trajectory information, the degree of correlation may be calculated using attribute information included in the trajectory information.

Figure 4:
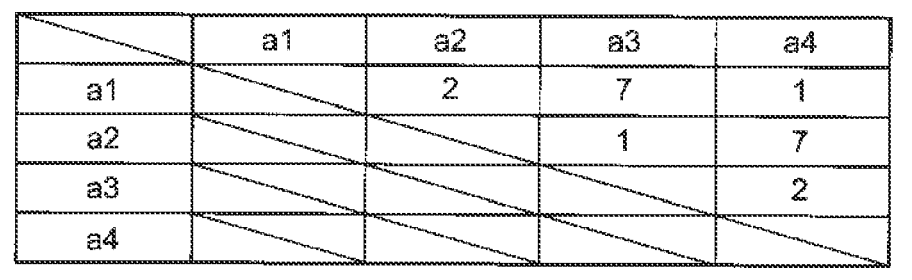

A case will be described as an example below where the correlation degree calculation means 222 calculates the degree of correlation using mobile body ID information. The correlation degree calculation means 222 determines an initial value "0" of a point to a combination of two different unit areas. Further, referring to the mobile body ID information acquired from the data hold means 21, when a common mobile body ID is detected in the two unit areas which form the combination, "1" is added to a point of the combination of the unit areas. Points which can be finally obtained per combination of unit areas by adding points in this way referring to the mobile body ID information acquired from the data hold means 21 is the degree of correlation in a combination of individual unit areas. FIG. 4 depicts a view illustrating an example of the degree of correlation calculated per combination of unit areas. In the example illustrated in FIG. 4, the degrees of correlation calculated for combinations of different unit areas of unit areas a1 to a4 are illustrated. For example, the degree of correlation between the unit areas a1 and a2 is "2". Further, for example, the degree of correlation between the unit areas a2 and a4 is "7". The degree of correlation between the unit areas a2 and a4 is "7" and takes a high value compared to the other degrees of correlations, and therefore the unit areas a2 and a4 have a high degree that sensor data (mobile body ID information) related to an identical mobile body is detected.

The correlation graph creation means 223 creates a graph by using unit areas generated by the unit area determination means 221 as nodes and connecting nodes by links according to a positional relationship between the unit areas in the trace area 50. Further, the correlation graph creation means 223 assigns as a weight the degree of correlation calculated for a combination of nodes (i.e. a combination of unit areas) at both ends, to the link connecting the nodes.

The correlation graph division means 224 deletes links of the graph created by the correlation graph creation means 223 in order of low degrees of correlation (weights) until a predetermined condition is satisfied. By this link deletion processing, the graph created by the correlation graph creation means 223 is divided.

For example, that the graph created by the correlation graph creation means 223 is divided into a predetermined number of graphs may be the above predetermined end condition (graph division end condition). Alternatively, that the amount of sensor data (for example, the number of pieces of trajectory information and the number of pieces of mobile body ID information) detected from the unit area group corresponding to graphs divided from the graph created by the correlation graph creation means 223 becomes a predetermined number or less may be the above predetermined end condition. The divided graphs represent divided areas based on which sensor data is distributed to the flow line detection units 3. By setting the graph division end condition such that sensor data detected from each node (that is, each unit area) of the divided graph has a data amount for which flow line detection can be performed with a low processing load, it is possible to have each flow line detection unit 3 precisely perform flow line detection with a low load. That is, it is possible to realize distribution processing of precise flow line detection with a low load.

Further, when inputting sensor data detected in a common unit area group to a plurality of flow line detection units 3, the correlation graph division means 224 prepares a plurality of the same graphs as the graph created by the correlation graph means 223 by creating a copy of the graph created by the correlation graph creation means 223. Furthermore, a graph may be divided such that divided graphs including nodes corresponding to the common unit area group is obtained per graph. FIG. 5 depicts an explanatory view illustrating an example of divided graphs which are divided graphs obtained from an identical graph and includes common nodes. The correlation graph creation means 223 creates the graph illustrated in FIG. 5(a). Further, the sensor data detected by unit areas corresponding to nodes n2 and n5 is outputted to a plurality of (two in this example) flow line detection units 3. In this case, the correlation graph division means 224 creates a copy of the graph illustrated in FIG. 5(a), and prepares two graphs illustrated in FIG. 5(a). The correlation graph division means 224 divides one of the graphs and obtains a divided graph including nodes n1, n2, n5 and n4 as illustrated in, for example, FIG. 5(b). Further, the correlation graph division means 224 divides the other one of the graphs and obtains a divided graph including nodes n2, n3, n6 and n5 as illustrated in, for example, FIG. 5(c). These two divided graphs each include the common nodes n2 and n5. In addition, in FIGS. 5(b) and (c), broken line links mean deleted links. Each graph illustrated in FIGS. 5(b) and (c) corresponds to a divided area based on which sensor data is distributed to the flow line detection unit 3. Consequently, it is possible to input sensor data detected in unit areas corresponding to the nodes n2 and n5 to the two flow line detection process units 3, respectively.

To prevent sensor data detected in an identical unit area from being doubly inputted to a plurality of flow line detection units 3, the correlation graph division means 224 only needs to divide the graph created by the correlation graph creation means 223 without creating a copy of the graph created by the correlation graph creation means 223.

The divided area determination means 225 divides the trace area 50 into areas corresponding to the divided graphs, based on unit areas corresponding to nodes included in the graphs divided by the correlation graph division means 224. The divided area may be represented as a list of unit areas represented as two dimensional coordinates. Alternatively, the divided area may be represented by one specific range (for example, a rectangular range) using the two-dimensional coordinates.

The data distribution means 23 (see FIG. 2) classifies the sensor data acquired from the data hold means 21 per divided area determined from the divided graphs. That is, the data distribution means 23 classifies the sensor data depending on in which divided area the sensor data is detected. Further, the sensor data classified per divided area is outputted to the different flow line detection units 3.

The flow line detection unit 3 (see FIGS. 1 and 2) associates a trajectory indicated by trajectory information and a mobile body ID indicated by mobile body ID information using sensor data (trajectory information and mobile body ID information) inputted from the data distribution means 23. That is, the flow line detection unit 3 performs flow line detection processing of deciding which trajectory is a trajectory of which mobile body. A flow line detection processing method is not limited in particular, and may be a known method. Further, each flow line detection unit 3 may be realized by a different computation unit.

In the first exemplary embodiment, the data hold means 21, the division rule application means 22 (the environment information storage unit 226, the unit area determination means 221, the correlation degree calculation means 222, the correlation graph creation means 223, the correlation graph division means 224 and the divided area determination means 225) and the data distribution means 23 are realized by a CPU of a computer which has, for example, storage apparatuses and operates according to a flow line detection process data distribution program. In this case, a program storage apparatus (not illustrated) of the computer stores the flow line detection process data distribution program, and the CPU only needs to read this program and operate according to this program as the data hold means 21, the division rule application means 22 (the environment information storage unit 226, the unit area determination means 221, the correlation degree calculation means 222, the correlation graph creation means 223, the correlation graph division means 224 and the divided area determination means 225) and the data distribution means 23.

Further, the data hold means 21, the division rule application means 22 and the data distribution means 23 may be realized by different hardware. The environment information storage unit 226, the unit area determination means 221, the correlation degree calculation means 222, the correlation graph creation means 223, the correlation graph division means 224 and the divided area determination means 225 may be realized by different hardware.

Figure 6:
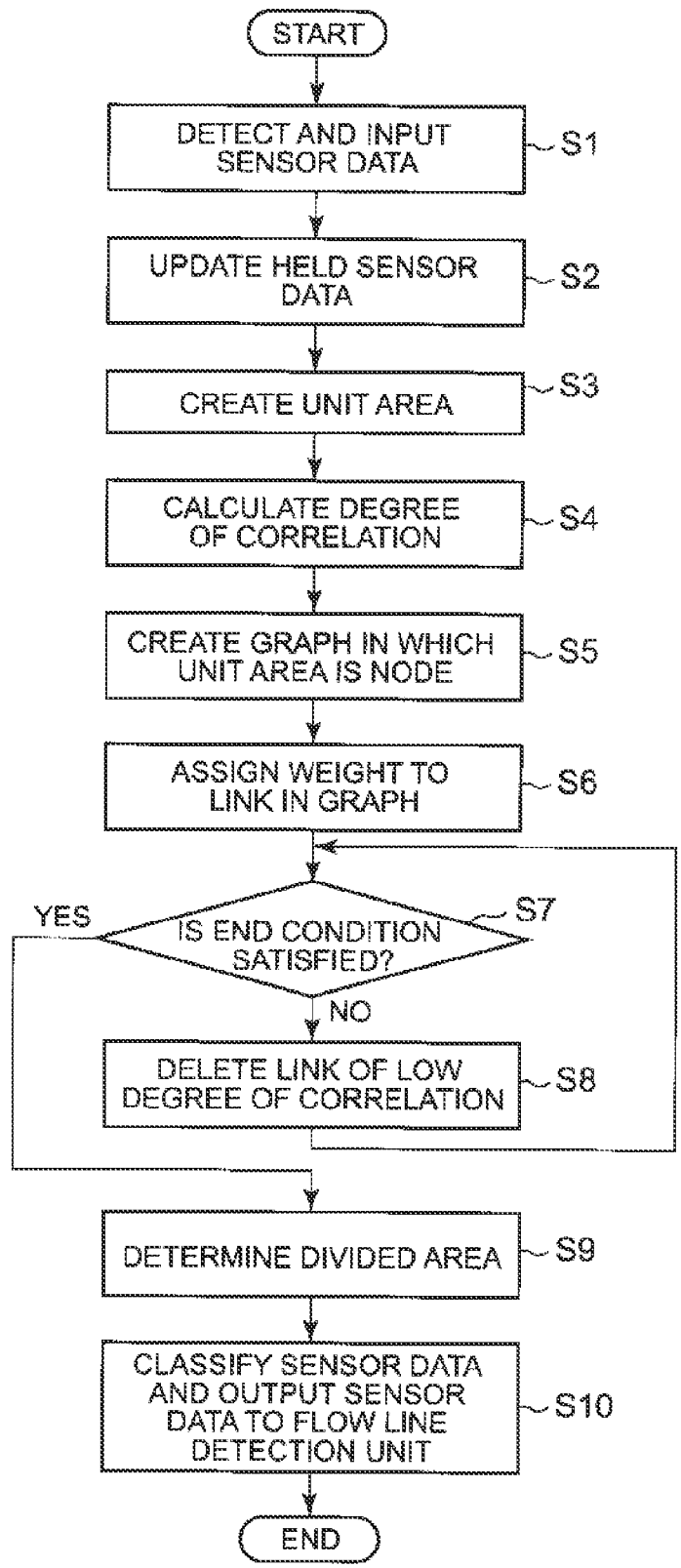
[FIG. 6] It depicts a flowchart illustrating an example of a processing procedure according to the first exemplary embodiment.

Next, an operation will be described. FIG. 6 depicts a flowchart illustrating an example of a processing procedure according to the first exemplary embodiment. Further, FIG. 7 depicts an explanatory view illustrating an example of a correspondence table which indicates a correspondence between identification information and an installation position coordinate of each mobile body ID detection apparatus stored in the environment information storage unit 226. In an example illustrated in FIG. 7, a number (identification number) is used as identification information of a mobile body ID detection apparatus. Further, in this correspondence table, identification numbers and installation position coordinates of all mobile body ID detection apparatuses which exist in the trace area 50 are associated. Furthermore, FIG. 8 depicts an explanatory view illustrating an example of information stored in the environment information storage unit 226 and indicating a range of the trace area 50. In an example illustrated in FIG. 8, coordinates of vertices v1 to v4 of the trace area are represented to represent the range surround by the vertices v1 to v4 as the trace area 50. Further, in the example illustrated in FIG. 8, the trace area 50 is rectangular. In the following description, the environment information storage unit 226 stores information illustrated in FIGS. 7 and 8.

Further, when detecting sensor data, the data input unit 1 inputs this sensor data to the data hold means 21 of the flow line detection process data distribution unit 2 (step S1). When, for example, detecting a position coordinate of a mobile body and generating trajectory information including a trajectory ID and a list of position coordinates and detection times of the position coordinates, the trajectory information detection apparatus belonging to the data input unit 1 inputs this trajectory information to the data hold means 21. Further, when detecting a mobile body ID from the mobile body and generating mobile body ID information including a mobile body ID, a detection position coordinate of the mobile body ID and a detection time of this mobile body ID, the mobile body ID detection apparatus belonging to the data input unit 1 inputs this mobile body ID information to the data hold means 21.

Next, the data hold means 21 updates held data such that trajectory information and mobile body ID information detected by the data input unit 1 in a past certain period of time from a current time (the latest time at which sensor data is inputted from the data input unit 1) are held (step S2). When, for example, receiving an input of latest trajectory information and mobile body ID information in step S1, the data hold means 21 additionally stores these trajectory information and mobile body ID information, and deletes trajectory information and mobile body ID information detected at a time before the time which is a certain period of time before the current time. As a result, the sensor data stored in the data hold means 21 is updated. In addition, the trajectory information includes a list of position coordinates of a mobile body and detection times of the position coordinates. When a detection time before the time which traces a certain period of time back from the current time is included in trajectory information, the data hold means 21 only needs to delete, for example, this detection time and a position coordinate corresponding to this detection time from the trajectory information. Alternatively, when all detection times in the list included in the trajectory information are times before the time which traces a past certain period of time back from the current time, the whole trajectory information may be deleted. Alternatively, when one of detection times in the list included in the trajectory information is a time before the time which traces a past certain period of time back from the current time, the whole trajectory information may be deleted.

In the first exemplary embodiment, the data hold means 21 acquires latest sensor data from the data input unit 1, and performs processing subsequent to step S3 every time held sensor data is updated.

Next, the unit area determination means 221 (see FIG. 3) reads identification numbers (identification information) and installation position coordinates of all mobile body ID detection apparatuses which exist in the trace area 50, from the correspondence table (see FIG. 7) stored in the environment information storage unit 226, and reads the information (see FIG. 8) which indicates the range of the trace area 50. Further, based on the read information, the unit area determination means 221 determines each unit area such that the condition that at least one mobile body ID detection apparatus exists in an individual unit area is satisfied (step S3).

Figure 9:
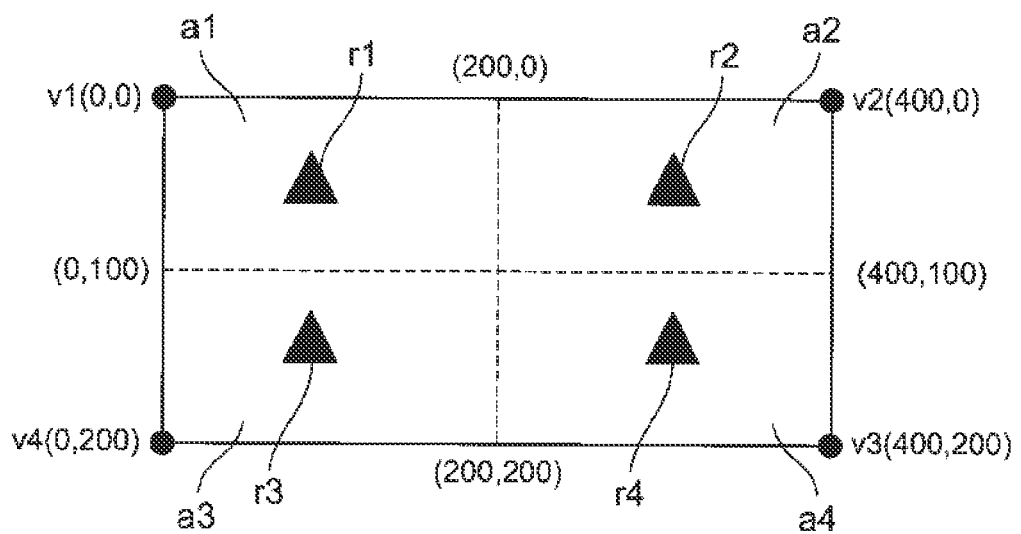
[FIG. 9] It depicts a schematic view illustrating an example of a unit area.

An example of method of determining unit areas in step S3 will be specifically described. The unit area determination means 221 only needs to create in the range of the trace area 50 a Voronoi diagram which include installation position coordinates of mobile body ID detection apparatuses r1 to r4 read from the environment information storage unit 226 as kernel points, and determine each Voronoi area created in the trace area 50 as a unit area. FIG. 9 depicts a schematic view illustrating an example of a created unit area. In an example illustrated in FIG. 9, the trace area is an area surrounded by the vertices v1 to v4, and the vertex coordinates are coordinates stored in advance in the environment information storage unit 226 (see FIG. 8). The unit area determination means 221 creates a Voronoi diagram which includes as kernel points the installation position coordinates of the mobile body ID detection apparatuses r1 to r4 which exist in this trace area. In this example, by dividing the trace area by four while boundaries are x=200 and y=100, four Voronoi areas a1 to a4 are obtained. The unit area determination means 221 determines these four Voronoi areas a1 to a4 as unit areas. In the following description, these four unit areas are represented as reference numerals "a1", "a2", "a3" and "a4", respectively.

Subsequent to step S3, the correlation degree calculation means 222 calculates the degree of correlation between unit areas (step S4). That is, the degree that sensor data (mobile body ID information in this case) related to an identical mobile body is detected between the unit areas is calculated.

A method of calculating the degree of correlation in step S4 will be more specifically described. In this example, the correlation degree calculation means 222 first determines an initial value (for example, "0") of a point for each combination of two unit areas in step S4. Further, every time a state in which the same mobile body ID is continuously detected between two arbitrary unit areas is checked, the correlation degree calculation means 222 increases by "1" the point of the combination of these two unit areas. More specifically, when sorting mobile body ID information the mobile body ID of which is common in order of detection times of mobile body IDs, the correlation degree calculation means 222 adds 1 to points of the combination of these two different unit areas if unit areas from which this mobile body ID is detected are different at two neighboring detection times.

FIG. 10 depicts an explanatory view illustrating a calculation example of the degree of correlation. The detection times and the mobile body IDs illustrated in FIG. 10 are detection times and mobile body IDs included in mobile body ID information. Further, identification numbers of mobile body ID detection apparatuses illustrated in FIG. 10 are information included in the mobile body ID information as detection position coordinates. Furthermore, FIG. 10 also illustrates unit areas in which mobile body ID detection apparatuses are installed in association with the identification numbers of the mobile body ID detection apparatuses.

In an example illustrated in FIG. 10, a mobile body ID "u1" is detected in the unit area a1 at a time t1. Further, at a time t2, this mobile body ID "u1" is detected in the unit area a2. Hence, when the mobile body ID "u1" is focused upon, it is detected in the different unit areas a1 and a2 at two adjacent detection times t1 and t2. Hence, the correlation degree calculation means 222 adds 1 to the degree of correlation between the unit areas a1 and a2.

Further, a mobile body ID "u2" is detected in the unit area a3 at a time t3. Furthermore, at a time t4, the mobile body ID "u1" is detected in the unit area a1. In this case, when the mobile body ID "u1" is focused upon, t2 and t4 are adjacent times in mobile body ID information including "u1", and "u1" is detected in the different unit areas a2 and a1 at the times t2 and t4. Hence, the correlation degree calculation means 222 further adds 1 to the degree of correlation between the unit areas a1 and a2.

Further, the mobile body ID "u2" is detected in the unit area a1 at a time t5. In this case, when the mobile body ID "u2" is focused upon, t3 and t5 are adjacent times in mobile body ID information including "u2", and "u2" is detected in the different unit areas a3 and a1 at the times t3 and t5. Hence, the correlation degree calculation means 222 adds 1 to the degree of correlation between the unit areas a1 and a3.

The correlation degree calculation means 222 performs the above computation targeting at mobile body ID information of a past certain period of time from the current time updated in step S2.

FIG. 4 illustrates values of points which are finally obtained for combinations of different unit areas as a result of the above computation, and the correlation degree calculation means 222 takes these values as the degrees of correlation.

In addition, as illustrated in FIG. 4, the degree of correlation is not calculated for a combination of an identical area such as a1 and a1. That is, even when detection times of a given mobile body ID continue, if a unit area in which this mobile body ID is detected is common, the correlation degree calculation means 222 does not add a point to a combination of the identical unit area.

In addition, when unit areas are manually determined in advance and unit area setting information is stored in the environment information storage unit 226, processing in step S4 may be performed using these unit areas after step S2.

Hereinafter, subsequent processing will be described assuming that the degree of correlation illustrated in FIG. 4 is obtained in step S4.

Figure 11:
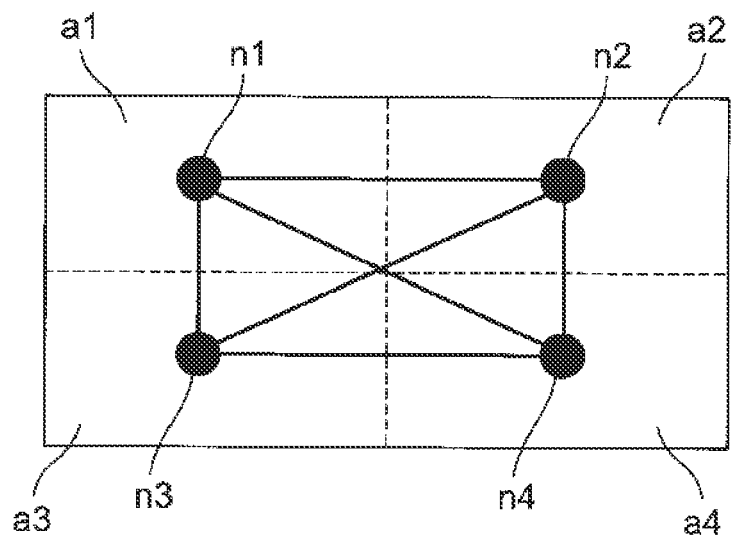
[FIG. 11] It depicts an explanatory view illustrating an example of a graph created by a correlation graph creation means 223.

After step S4, the correlation graph creation means 223 creates a graph in which unit areas are nodes and different nodes are connected by links (step S5). For example, the four unit areas a1, a2, a3 and a4 are determined as illustrated in FIG. 9. In this case, as illustrated in FIG. 11, the correlation graph creation means 223 determines nodes n1, n2, n3 and n4 associated with unit areas. In FIG. 11, the node n1 is associated with the unit area a1. The node n2 is associated with the unit area a2. The node n3 is associated with the unit area a3. The node n4 is associated with the unit area a4. Each node represents each associated unit area. Further, the correlation graph creation means 223 creates a graph (see FIG. 11) in which different nodes are connected by links in these four nodes n1 to n4.

In addition, the links which connect the different nodes can represent combinations of two different unit areas.

Figure 12:
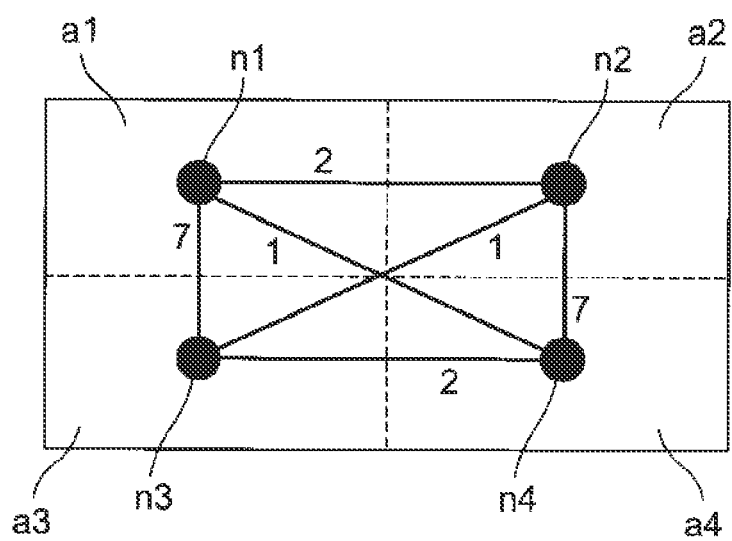
[FIG. 12] It depicts an explanatory view indicating a state in which weights are assigned to links in a graph.

After step S5, the correlation graph creation means 223 assigns the degree of correlation as a weight to each link in the graph created in step S5 (step S6). That is, the correlation graph creation means 223 assigns to the links in the graph the degrees of correlation calculated for the combinations of unit areas represented by these links. As illustrated in, for example, FIG. 4, the degree of correlation of the combination of the unit areas a1 and a2 is "2", and the correlation graph creation means 223 assigns a weight (the degree of correlation) "2" to a link which connects the nodes n1 and n2. In this example, a weighted graph illustrated in FIG. 12 is generated by performing step S6 with respect to the graph illustrated in FIG. 11. In FIG. 12, a value indicated near each link is a weight (the degree of correlation).

Subsequent to step S6, the correlation graph division means 224 decides whether or not a currently obtained graph satisfies a predetermined condition set in advance (graph division processing end condition) (step S7). Meanwhile, a case will be described as an example where a condition that the total number of pieces of trajectory information detected from each node (in other words, unit area) included in one graph is thirty or less is used as the graph division processing end condition. In addition, one trajectory information represents one trajectory, and therefore that the total number of pieces of trajectory information is thirty or less is equivalent to that the number of trajectories is thirty or less. Further, the above end condition is exemplary, and the graph division processing end condition is not limited to the above example. Although, for example, the above end condition is based only on the number of pieces of trajectory information, the end condition may be based on both of the number of pieces of trajectory information and the number of pieces of mobile body ID information. Alternatively, the end condition may be based only on the number of pieces of mobile body ID information. Further, that the number of divided graphs is a threshold or more based on the number of divided graphs may be the graph division end condition.

Figure 13:
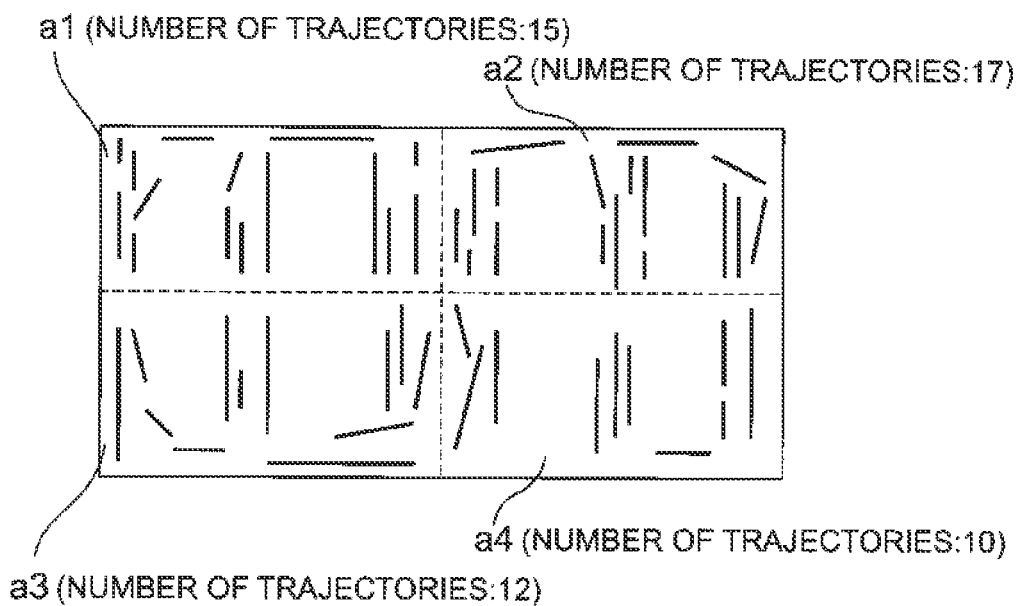
[FIG. 13] It depicts a view illustrating an example of a trajectory of each unit area detected during a past certain period of time from a current time.

FIG. 13 depicts a view illustrating an example of a trajectory of each unit area detected during a past certain period of time from a current time. Each trajectory illustrated in FIG. 13 is represented by trajectory information. In the list of position coordinates of a mobile body in one trajectory information, a line which connects each coordinate is one trajectory in FIG. 13. In an example illustrated in FIG. 13, fifteen trajectories are detected from the unit area a1. This means that fifteen pieces of trajectory information are obtained from the unit area a1. Further, in the example illustrated in FIG. 13, seventeen trajectories are detected from the unit area a2, twelve trajectories are detected from the unit area a3 and ten trajectories are detected from the unit area a4.

When step S6 transitions to step S7, links are determined between all nodes, and the graph represents a state in which the unit areas a1 to a4 are mutually connected. The total number of pieces of trajectory information (trajectories) detected from an area in which the unit areas a1 to a4 are connected is 54 (=15+17+12+10). Hence, in this case, the correlation graph division means 224 decides that the currently obtained graph does not satisfy the graph division end condition (No in step S7).

When deciding in step S7 that the graph division end condition is not satisfied, the correlation graph division means 224 deletes a link of the lowest weight (the degree of correlation) from the links in the graph (step S8) and repeats processing subsequent to step S7. By repeating steps S7 and S8, the correlation graph division means 224 deletes the links in the graph from the lowest weight.

Further, in step S8, when there is a plurality of links of the lowest weight, the correlation graph division means 224 may delete all of a plurality of links. Alternatively, one link may be selected from a plurality of links, and the selected link may be deleted. In this case, a method of selecting one link from a plurality of links is not limited in particular. This example will be described assuming that, when there is a plurality of links of the lowest weight, the correlation graph division means 224 deletes all of a plurality of links.

Figure 14:
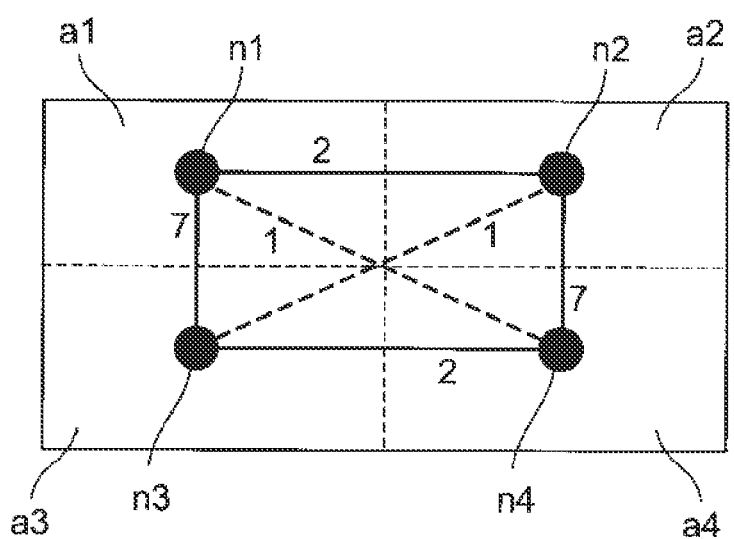
[FIG. 14] It depicts a view illustrating an example of a graph from which links are deleted.

In this example, the graph upon the first transition to step S8 is in the state illustrated in FIG. 12. The correlation graph division means 224 searches for a link of the lowest weight from the links of the graph illustrated in FIG. 12. In the graph illustrated in FIG. 12, a lowest value of a weight of a link is 1. Further, the link the weight of which is 1 is a link which connects the nodes n1 and n4, and a link which connects the nodes n2 and n3. Hence, the correlation graph division means 224 selects these two links, and deletes the two links. By deleting the links in step S8, the state of the graph is updated. The state of the graph after the links are deleted is illustrated in FIG. 14. In addition, in FIG. 14 and FIG. 15 which is described below, broken lines represent deleted links.

After step S8, the correlation graph division means 224 decides again whether or not to finish graph division (step S7). The graph illustrated in FIG. 14 represents a state in which the nodes n1 and n2, the nodes n2 and n4, the nodes n4 and n3 and the nodes n3 and n1 are respectively connected by links, and all unit areas represented by nodes are connected. Therefore, the total number of pieces of trajectory information (trajectories) detected from an area in which the unit areas a1 to a4 are connected is 54, and the end condition is not satisfied (No in step S7). Hence, the flowchart transitions to step S8 again.

Figure 15:
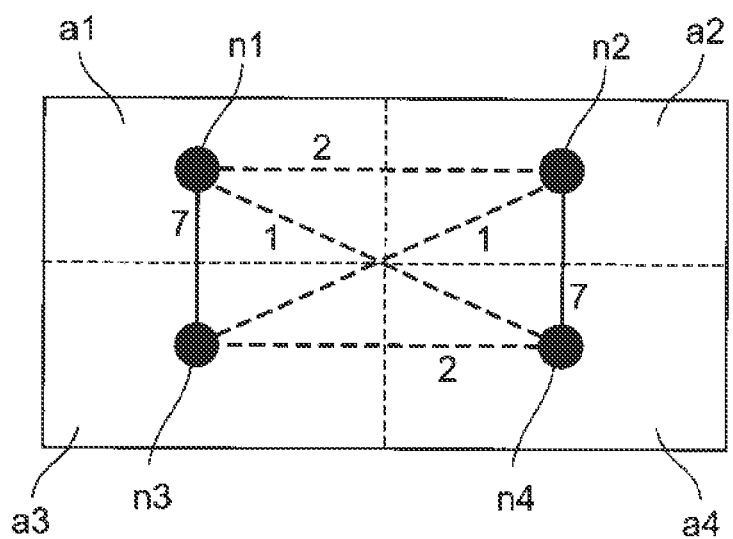
[FIG. 15] It depicts a view illustrating an example of a divided graph from which links are deleted.

Next, the correlation graph division means 224 searches for the link of the lowest weight from the graph illustrated in FIG. 14. In the graph illustrated in FIG. 14, the lowest value of the weight of the link is 2. Further, the link the weight of which is 2 is a link which connects the nodes n1 and n2, and a link which connects the nodes n3 and n4. Hence, the correlation graph division means 224 selects these two links, and deletes the two links. The state of the graph after the links are deleted is illustrated in FIG. 15.

After step S8, the correlation graph division means 224 decides again whether or not to finish graph division (step S7). In the graph illustrated in FIG. 15, only the link which connects the nodes n1 and n3 and the link which connects the nodes n2 and n4 are left. In this state, the graph which includes the nodes n1 and n3 and the graph which includes the nodes n2 and n4 are not mutually connected. Hence, in this state, graphs are divided into the graph which includes the nodes n1 and n3 and the graph which includes the nodes n2 and n4. The graph which includes the nodes n1 and n3 among these two divided graphs represent an area which integrates the unit areas a1 and a3. Further, the other graph which includes the nodes n2 and n4 represents an area which integrates the unit areas a2 and a4. Furthermore, the number of pieces of trajectory information (trajectories) detected from an area which integrates the unit areas a1 and a3 is 27 (=15+ 12), and the number of pieces of trajectory information detected from the area which integrates the unit areas a2 and a4 is 27 (=17+10) (see FIG. 13). Hence, the correlation graph division means 224 decides that both the graph which includes the nodes n1 and n3 and the graph which includes the nodes n2 and n4 satisfy the graph division end condition (Yes in step S7), and transitions to step S9.

In addition, although the case has been described with this example where the two divided graphs each satisfy the end condition, when there is a graph which does not satisfy the end condition among individual divided graphs, steps S7 and S8 only need to be repeated until the graph which does not satisfy the end condition satisfy the end condition.

Further, although the case has been described with the above example where the flowchart returns to step S7 every time a link is deleted in step S8, even when a graph is not divided even after the link is deleted in step S8, deletion of links may be repeated until the graph is divided in step S8. Furthermore, at a point of time at which the graph is divided, the flowchart may return to step S7.

When the graph division end condition is satisfied (Yes in step S7), the divided area determination means 225 divides the trace area 50 (see FIG. 1) into divided areas associated with the divided graphs based on the individual divided graphs (step S9). As illustrated in FIG. 15, when two graphs of the graph including the nodes n1 and n3 and the graph including the nodes n2 and n4 are obtained, the graph including the nodes n1 and n3 represents an area which integrates the unit areas a1 and a3, and the graph including the nodes n2 and n4 represents an area which integrates the unit areas a2 and a4. Hence, the divided area determination means 225 divides the trace area 50 into two of the area which integrates the unit areas a1 and a3 and the area which integrates the unit areas a2 and a4. That is, the area which integrates the unit areas a1 and a3 and the area which integrates the unit areas a2 and a4 are divided areas of the trace area.

When determining the divided areas from the trace area 50 in step S9, the divided area determination means 225 inputs the division result to the data distribution mean 23. In this case, a method of representing the divided areas is not limited in particular. When, for example, the divided areas are represented, the divided areas may be represented as a list of unit areas included in the divided areas. Individual unit areas are represented by arranging vertex coordinates of unit areas. Then, for example, the divided area which integrates the unit areas a1 and a3 is represented by a list of the unit area a1 [an upper left coordinate (0, 0), an upper right coordinate (200, 0), a lower right coordinate (200, 100) and a lower left coordinate (0, 100)] and the unit area a3 [an upper left coordinate (0, 100), an upper right coordinate (200, 100), a lower right coordinate (200, 200) and a lower left coordinate (0, 200)]. Similarly, the divided area which integrates the unit areas a2 and a4 is represented by a list of the unit area a2 [an upper left coordinate (200, 0), an upper right coordinate (400, 0), a lower right coordinate (400, 100) and a lower left coordinate (200, 100)] and the unit area a4 [an upper left coordinate (200, 100), an upper right coordinate (400, 100), a lower right coordinate (400, 200) and a lower left coordinate (200, 200)].

Further, when, for example, the divided area is represented, the divided area may be represented by arranging vertices of the divided area. For example, the divided area which integrates the unit areas a1 and a3 may be represented by [an upper left coordinate (0, 0), an upper right coordinate (200, 0), a lower right coordinate (200, 200) and a lower left coordinate (0, 200)]. Further, the divided area which integrates the unit areas a2 and a3 may be represented by [an upper left coordinate (200, 0), an upper right coordinate (400, 0), a lower right coordinate (400, 200) and a lower left coordinate (200, 200)].

After step S9, the data distribution means 23 classifies the sensor data (the trajectory information and the mobile body ID information of a past certain period of time from the current time) updated in step S2 based on the divided areas determined by the divided area determination means 225. That is, the trajectory information and the mobile body ID information are classified depending on in which divided area the trajectory information and the mobile body ID information are detected. Further, the data distribution means 23 outputs the classified trajectory information and the mobile body ID information to the different flow line detection units 3 (step S10). In the above example, the data distribution means 23 classifies the trajectory information and the mobile body ID information into trajectory information and mobile body ID information detected in the divided area which integrates the unit areas a1 and a3, and trajectory information and mobile body ID information detected in the divide area which integrates the unit areas a2 and a4. Further, the trajectory information and the mobile body ID information detected in the divided area which integrates the unit areas a1 and a3 are outputted to one flow line detection unit 3, and the trajectory information and the mobile body ID information detected in the divided area which integrates the unit areas a2 and a4 are outputted to another flow line detection unit 3.

Each flow line detection unit 3 which receives an input of the trajectory information and the mobile body ID information associates the mobile body ID included in the mobile body ID information and a trajectory represented by the trajectory information by using this trajectory information and mobile body ID information.

According to the present exemplary embodiment, the data hold means 21 holds sensor data of a past certain period of time detected from a mobile body. Further, the division rule application means 22 calculates for combinations of unit areas belonging to the trace area 50 the degrees of correlations which indicate degrees that sensor data related to an identical mobile body is detected. Furthermore, when the divided areas obtained by dividing the trace area 50 are determined, the divided areas are determined such that the divided areas are areas which integrate unit areas of high degrees of correlation. Hence, the sensor data detected in each divided area is highly likely to be sensor data related to an identical mobile body. Further, the data distribution means 23 classifies the sensor data of a past certain period of time per divided area in which the sensor data is detected, and outputs the classified sensor data to the different flow line detection units 3. Furthermore, each flow line detection unit 3 which has received an input of sensor data performs flow line detection. Consequently, it is possible to perform distribution processing of flow line detection and prevent an increase in a processing load in the individual flow line detection units 3 even when the trace area 50 is a wide range and multiple mobile bodies exist. Further, sensor data is classified per divided area in which sensor data related to the identical mobile body is likely to be detected, so that each flow line detection unit 3 can precisely perform flow line detection processing.

Furthermore, according to a detection tendency of sensor data detected by the data input unit 1, the number of the flow line detection units 3 which perform flow line detection processing may be controlled. In this case, it is possible to save energy required for the flow line detection processing. Control may be performed such that, when, for example, there are a small number of mobile bodies in a wide trace area, one computation unit (flow line detection unit 3) executes flow line detection and, when there are multiple mobile bodies in a wide trace area, a plurality of flow line detection units 3 performs flow line detection.

Second Exemplary Embodiment

In the first exemplary embodiment, a data hold means 21 acquires latest sensor data from a data input unit 1, and performs processing subsequent to step S3 (see FIG. 6) every time held sensor data is updated. Meanwhile, following addition of new sensor data, the data hold means 21 may not determine divided areas every time the held sensor data is updated. Under, for example, a condition that a predetermined time or more passes after the divided areas are determined, processing up to determination of the divided areas (steps S3 to S9) may be executed. In the second exemplary embodiment, as described above, when a predetermined time or more passes after the divided areas are determined, the processing in steps S3 to S9 is executed.

Figure 16:
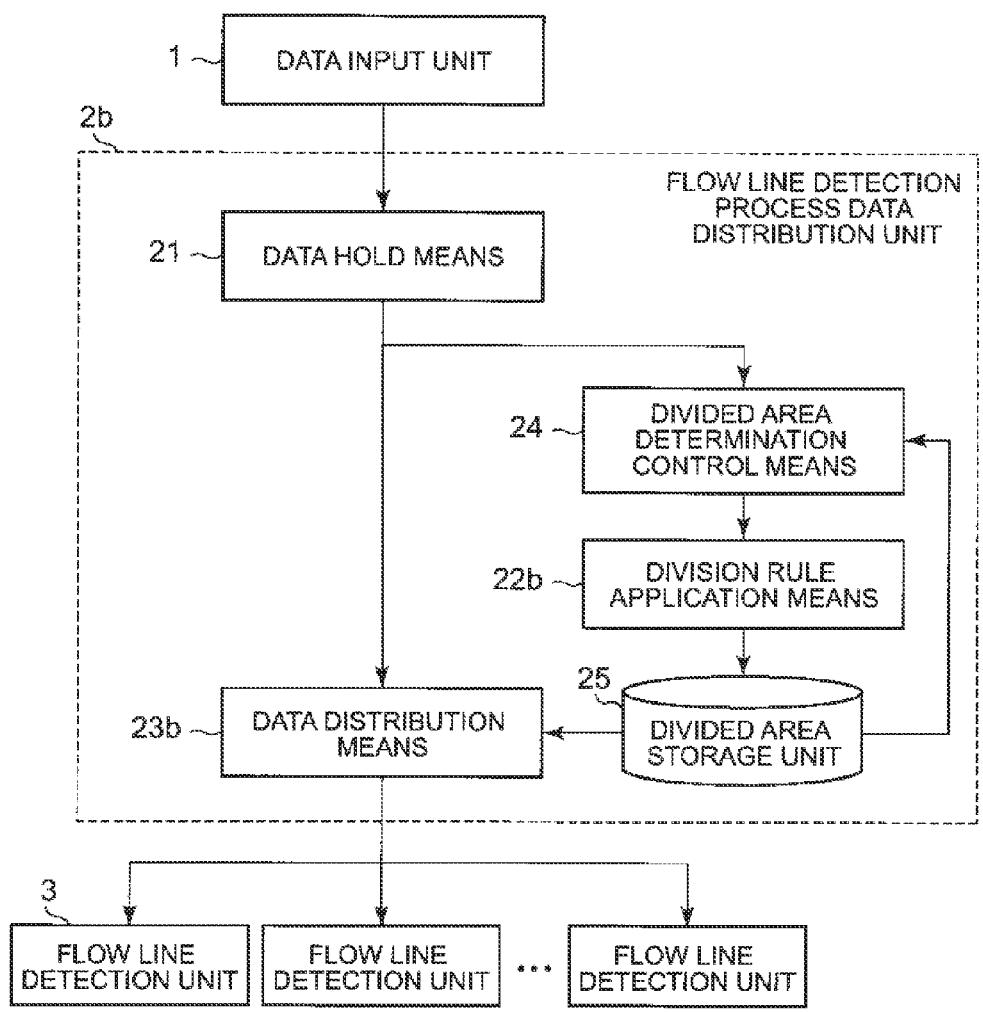
[FIG. 16] It depicts a block diagram illustrating a configuration example of a flow line detection process data distribution unit according to a second exemplary embodiment.

FIG. 16 depicts a block diagram illustrating a configuration example of a flow line detection process data distribution unit according to the second exemplary embodiment. In addition, the data input unit 1 and the flow line detection unit 3 are also illustrated. Further, the same components as components according to the first exemplary embodiment will be assigned the same reference numerals as those in FIG. 2, and will not be described.

A flow line detection process data distribution unit 2b according to the second exemplary embodiment differs from a flow line detection process data distribution unit 2 according to the first exemplary embodiment in performing processing of determining divided areas when a predetermined time or more passes after divided areas are determined. The flow line detection process data distribution unit 2b has the data hold means 21, a division rule application means 22b, a divided area determination control means 24, a divided area storage unit 25 and a data distribution means 23b.

A configuration of the division rule application means 22b is the same as a configuration of a division rule application means 22 according to the first exemplary embodiment, and has an environment information storage unit 226, a unit area determination means 221, a correlation degree calculation means 222, a correlation graph creation means 223, a correlation graph division means 224 and a divided area determination means 225 (see FIG. 3). Operations and configurations of these means 221 to 226 are the same operations and configurations of means 221 to 226 according to the first exemplary embodiment. Meanwhile, a timing when the unit area determination means 221 starts processing of determining unit areas is when a processing start command is inputted from the divided area determination control means 24. That is, although, in the first exemplary embodiment, the unit area determination means 221 starts processing of determining unit areas when the data hold means 21 updates sensor data, in the second exemplary embodiment, the unit area determination means 221 starts processing of determining unit areas at a timing when a command is received from the divided area determination control means 24. An operation from determination of unit areas to determination of divided areas is the same as the operation in the first exemplary embodiment.

In addition, similar to the first exemplary embodiment, the environment information storage unit 226 may store information (such as information illustrated in FIGS. 7 and 8) for determining unit areas or may store unit area setting information which represents unit areas determined in advance. When the environment information storage unit 226 stores unit area setting information, if a processing start command is inputted to the division rule application means 22b from the divided area determination control means 24, the correlation degree calculation means 222 only needs to start processing of calculating the degree of correlation using the unit areas.

The divided area storage unit 25 is a storage apparatus which stores information which indicates divided areas determined by the division rule application means 22b and times when the divided areas are determined by the division rule application means 22b. When determining the divided areas, the divided area determination means 225 of the division rule application means 22b stores information which indicates individual divided areas and times at which the divided areas are determined, in the divided area storage unit 25.

The divided area determination control means 24 refers to a previous divided area determination time which is stored in the divided area storage unit 25, and decides whether or not the divided areas are determined again. When it is decided that the divided areas are determined again, the divided area determination control means 24 inputs a processing start command to the division rule application means 22b. More specifically, when new sensor data is added to the data hold means 21 and the sensor data held by the data hold means 21 is updated, the divided area determination control means 24 decides whether or not a predetermined time or more passes from the previous divided area determination time. Further, when the predetermined time or more passes from the previous divided area determination time, it is decided that the divided areas are determined again, and the processing start command is inputted to the division rule application means 22b.

The data distribution means 23b classifies sensor data (trajectory information and mobile body ID information) based on the determined divided areas, and outputs the classified sensor data to the different flow line detection units 3. Meanwhile, in the second exemplary embodiment, when new sensor data is added to the data hold means 21 and the sensor data held by the data hold means 21 is updated, the data distribution means 23b classifies the sensor data based on the divided areas indicated by the information stored in the divided area storage unit 25 and distributes the sensor data to the flow line detection units 3.

In the second exemplary embodiment, the data hold means 21, the division rule application means 22b, the divided area determination control means 24 and the data distribution means 23b are realized by a CPU of a computer which has, for example, storage apparatuses and operates according to a flow line detection process data distribution program. Further, the data hold means 21, the division rule application means 22b, the divided area determination control means 24 and the data distribution means 23b may be realized by different hardware.

Figure 17:
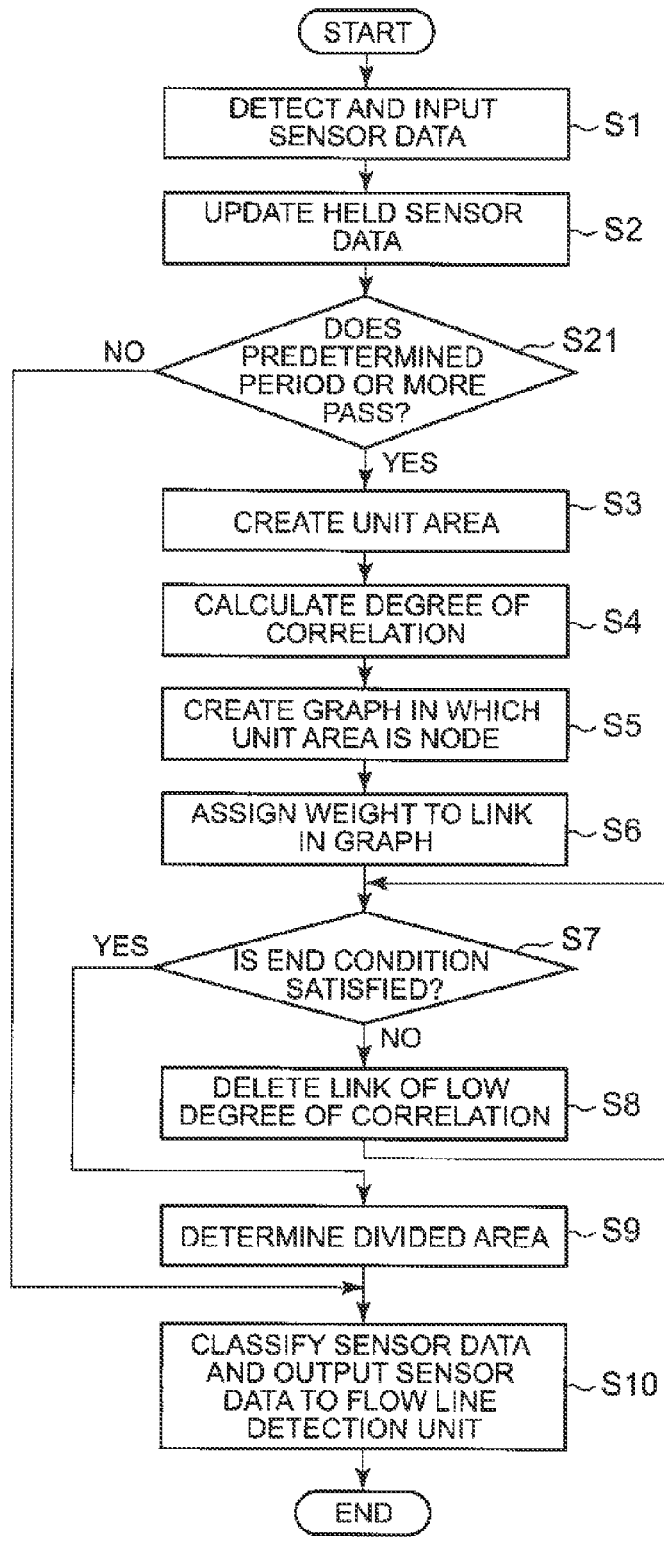
[FIG. 17] It depicts a flowchart illustrating an example of a processing procedure according to the second exemplary embodiment.

FIG. 17 depicts a flowchart illustrating an example of a processing procedure according to the second exemplary embodiment. The same operations as operations in the first exemplary embodiment will be assigned the same reference numerals in FIG. 6, and will not be described.

The operations up to step S2 are the same as operations up to step S2 in the first exemplary embodiment. When the data hold means 21 additionally stores newly inputted sensor data and updates the held sensor data in step S2, the divided area determination control means 24 refers to the previous divided area determination time stored in the divided area storage unit 25, and decides whether or not a predetermined time or more passes after the previous divided area determination time (step S21). When deciding in step S21 that the predetermined time or more passes from the previous divided area determination time, the divided area determination control means 24 outputs a processing start command to the division rule application means 22b. In addition, in an initial state, information which indicates divided areas and information of times are not stored in the divided area storage unit 25. In this case, the divided area determination control means 24 outputs a processing start command to the division rule application means 22b.

When receiving this processing start command, the unit area determination means 221 (see FIG. 3) of the division rule application means 22b reads information (such as the information illustrated in FIGS. 7 and 8) stored in the environment information storage unit 226, and determines each unit area (step S3). Further, subsequent to step S3, the division rule application means 22b sequentially performs processing up to determination of divided areas (steps S4 to S9). The operations in steps S3 to S9 are the same as operations in steps S3 to S9 in the first exemplary embodiment.

Meanwhile, in step S9, when determining the divided areas, the divided area determination means 225 of the division rule application means 22b stores information which indicates individual divided areas and times at which processing of determining the divided areas is performed, in the divided area storage unit 25.

Subsequently, the data distribution means 23b reads information which indicates the new divided area determined in step S9, from the divided area storage unit 25, and classifies the sensor data (trajectory information and mobile body ID information) updated in step S2 based on the divided areas. A method of classifying sensor data based on divided areas is the same as the method of classifying sensor data according to the first exemplary embodiment. Further, the data distribution means 23b outputs the classified trajectory information and mobile body ID information to the different flow line detection units 3 (step S10).

Furthermore, when it is decided in step S21 after step S2 that a predetermined time or more does not pass from the previous divided area determination time, the data distribution means 23b reads information (information which indicates divided areas) stored in the divided area storage unit 25 at this point of time, and classifies the sensor data (the trajectory information and the mobile body ID information) updated in step S2. Still further, the data distribution means 23b outputs the classified trajectory information and mobile body ID information to the different flow line detection units 3 (step S10).

Each flow line detection unit 3 which receives an input of sensor data performs flow line detection processing in the same way as the flow line detection unit 3 in the first exemplary embodiment.

In addition, a case has been described with an example illustrated in FIG. 17 where decision in step S21 is performed after step S2. The divided area determination control means 24 may monitor whether or not the predetermined time or more passes from the previous divided area determination time irrespectively of whether or not step S2 is executed, and output a processing start command to the division rule application means 22b when deciding that the predetermined time or more passes from the previous determination time. Thus, when decision in step S21 is performed independently from step S2, step S10 is not performed subsequently after divided areas are determined in step S9. In this case, when the sensor data held by the data hold means 21 is updated in step S2, the data distribution means 23b only needs to classify sensor data based on divided areas indicated by information stored in the divided area storage unit 25 at the point of time, and distribute the sensor data to the flow line detection units 3 (step S10).

Further, also in the second exemplary embodiment, the divided areas are determined such that the divided areas are areas which integrate unit areas of high degrees of correlation. The divided areas are formed by integrating unit areas from which sensor data related to an identical mobile body is likely to be detected. Further, a tendency of movement of an individual mobile body does not change so much in many cases. In environment such as an office or a large commercial building, partitions or shelves restrict routes of movement of people to some degree. Hence, the tendency of movement of people does not change in a short time in many cases. In the present exemplary embodiment, instead of determining divided areas every time new sensor data is added and the sensor data held by the data hold means 21 is updated, divided areas are determined when a condition that a predetermined time or more passes from a previous divided area determination time is satisfied. Consequently, it is possible to reduce the number of times of processing (the processing in steps S3 to S9 in the example of the above exemplary embodiment) up to determination of divided areas, and reduce a processing time of the flow line detection process data distribution unit 2b.

Further, the tendency of movement of a mobile body does not change in a short time in many cases as already described, so that, even when the number of times to execute processing up to determination of divided areas is reduced as described above, it is possible to maintain high precision of flow line detection processing without negatively affecting precision of flow line detection processing.

Third Exemplary Embodiment

As described above, in the first exemplary embodiment, a correlation graph division means 224 continues processing of dividing a graph until graph division end condition determined in advance is satisfied (steps S7 and S8, see FIG. 6). As illustrated in, for example, the first exemplary embodiment, a condition that the sum of the numbers of pieces of trajectory information detected from each node (in other words, a unit area) included in one graph is the number (threshold) determined in advance or less is used as the graph division end condition. However, when a great amount of trajectory information is instantaneously detected from one given unit area, only the number of pieces of trajectory information detected from this unit area may exceed the threshold. In this case, even when a graph is repeatedly divided until one graph is left in one node which represents this unit area, the graph including only this node does not satisfy the graph division condition. The correlation graph division means 224 cannot divide this graph more, and therefore stops dividing the graph even if the above condition is not satisfied. Then, the divided area determination means determines the unit area represented by this one node as one divided area, and, as a result, the data distribution means 23 outputs sensor data detected from this divided area to one flow line detection unit 3. Meanwhile, the great amount of trajectory information is instantaneously detected from this divided area, and therefore a calculation load of flow line detection becomes significant in some cases.

In the third exemplary embodiment, when sensor data is classified based on divided areas, if the amount of sensor data detected from one divided area is significant, the sensor data is reduced and is outputted to one flow line detection unit 3. When, for example, the number of items of sensor data detected from one divided area is higher than the threshold used for the graph division end condition, the number of items of sensor data is reduced.

Figure 18:
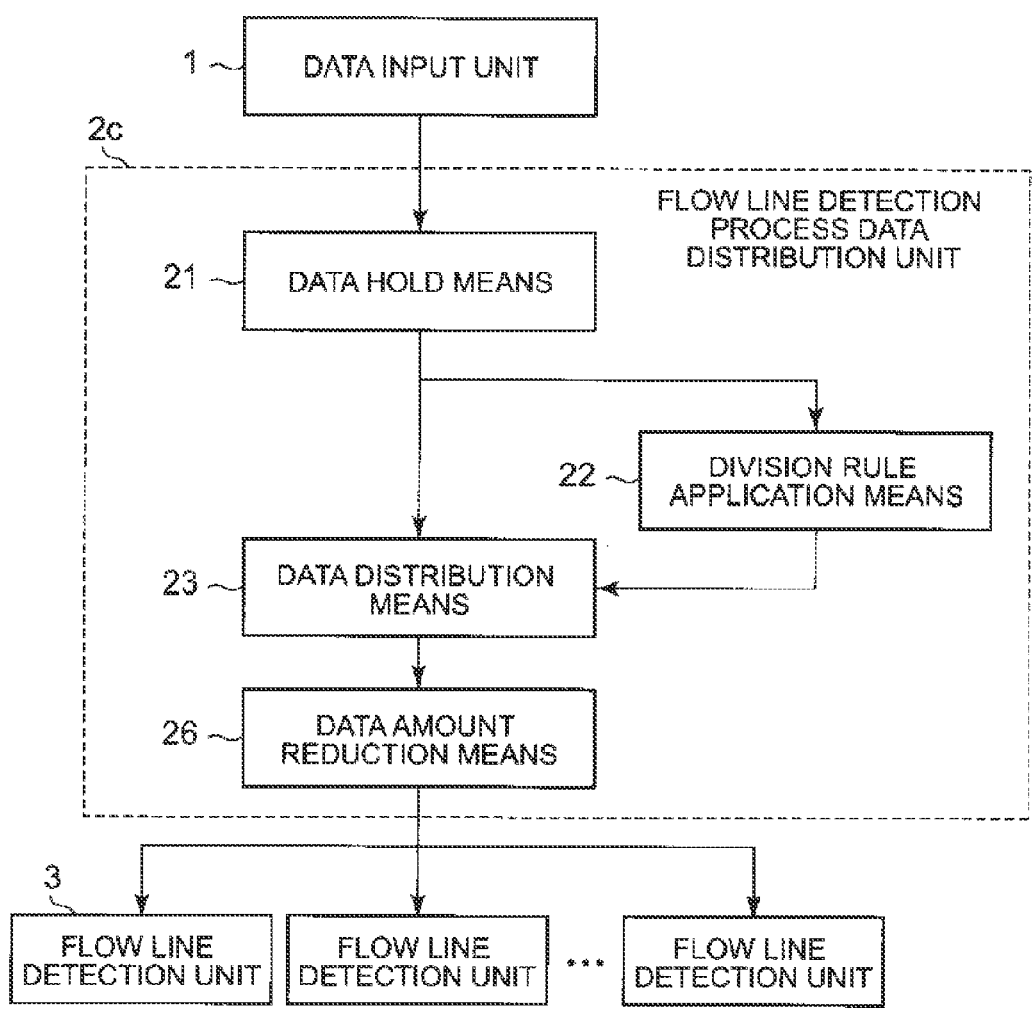
[FIG. 18] It depicts a block diagram illustrating a configuration example of a flow line detection process data distribution unit according to a third exemplary embodiment.

FIG. 18 depicts a block diagram illustrating a configuration example of a flow line detection process data distribution unit according to the third exemplary embodiment. In addition, the data input unit 1 and the flow line detection unit 3 are also illustrated. Further, the same components as components according to the first exemplary embodiment will be assigned the same reference numerals as those in FIG. 2, and will not be described.

The flow line detection process data distribution unit 2c according to the third exemplary embodiment decides whether or not the data amount is an amount which can be processed by the flow line detection unit 3 per sensor data classified based on the divided areas, and reduces the amount of this sensor data when the data amount exceeds the amount which can be processed by the flow line detection unit 3. In this regard, the flow line detection process data distribution unit 2c differs from a flow line detection process data distribution unit 2 according to the first exemplary embodiment. The flow line detection process data distribution unit 2c has a data hold means 21, a division rule application means 22, a data distribution means 23 and a data amount reduction means 26.

A configuration of the division rule application means 22 is the same as a configuration of a division rule application means 22 according to the first exemplary embodiment, and has an environment information storage unit 226, a unit area determination means 221, a correlation degree calculation means 222, a correlation graph creation means 223, a correlation graph division means 224 and a divided area determination means 225 (see FIG. 3). Operations and configurations of these means 221 to 226 are the same operations and configurations of means 221 to 226 according to the first exemplary embodiment. Meanwhile, the correlation graph division means 224 cannot further divide a graph which includes only one node which is not connected with another node by a link even if the graph does not satisfy the graph division end condition, and therefore finishes dividing the graph. That is, in the present exemplary embodiment, that the divided graph becomes the graph which includes only one node which is not connected with another node by a link is also the graph division end condition.

The data distribution means 23 classifies sensor data (trajectory information and mobile body ID information) of a past certain period of time from the current time based on divided areas. Further, the data distribution means 23 inputs a group of items of sensor data classified per divided area to the data amount reduction means 26.

The data amount reduction means 26 decides whether or not the number of items of sensor data belonging to the group is the amount which can be processed by the flow line detection unit 3 to which the sensor data of this group is scheduled to be inputted per group of the sensor data classified per divided area by the data distribution means 23, and, when the number of items of sensor data exceeds the amount which can be processed by this flow line detection unit 3, reduces the number of items of sensor data of this group until the number of items of sensor data becomes the amount which can be processed by this flow line detection unit 3. When reducing the sensor data, the data amount reduction means 26 may reduce sensor data in order of, for example, older detection times. Further, when reducing trajectory information included in the sensor data, the data amount reduction means 26 may refer to a list of detection times in the trajectory information and reduce trajectory information in order of shorter durations from the oldest detection time to the newest detection time in the trajectory information.

When the amount of classified sensor data of individual groups becomes the amount which can be processed by the corresponding flow line detection unit 3, the data amount reduction means 26 outputs the sensor data of each group to the different flow line detection units 3 per group.

In the third exemplary embodiment, the data hold means 21, the division rule application means 22, the data distribution means 23 and the data amount reduction means 26 are realized by a CPU of a computer which has, for example, storage apparatuses and operates according to a flow line detection process data distribution program. Further, the data hold means 21, the division rule application means 22, the data distribution means 23 and the data amount reduction means 26 may be realized by different hardware.

Figure 19:
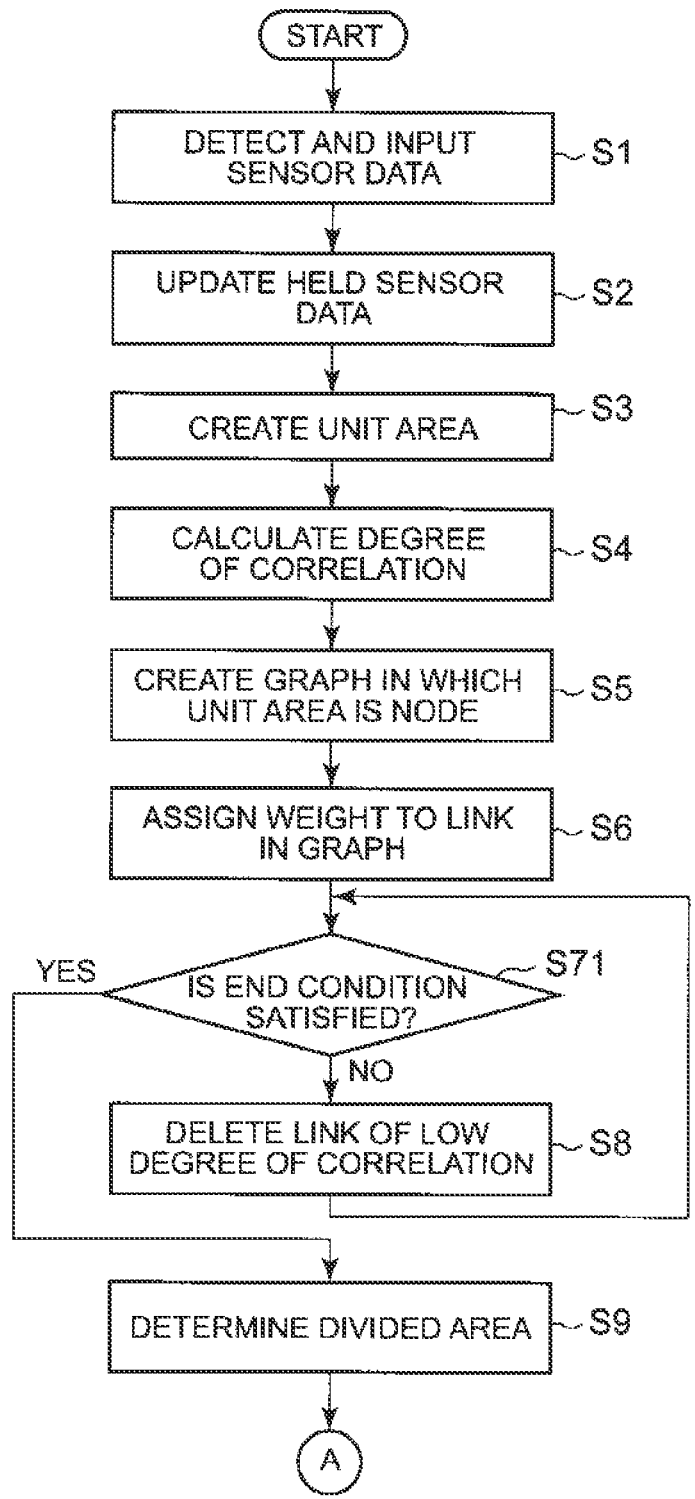
[FIG. 19] It depicts a flowchart illustrating an example of a processing procedure according to the third exemplary embodiment.
Figure 20:
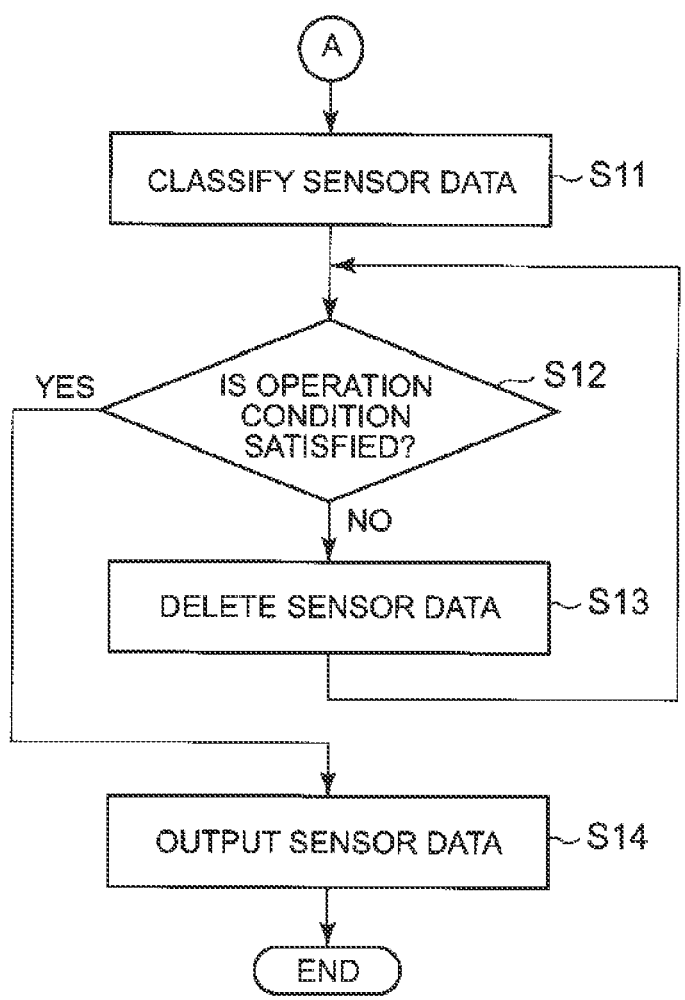
[FIG. 20] It depicts a flowchart illustrating an example of a processing procedure according to the third exemplary embodiment.

FIGS. 19 and 20 depict flowcharts illustrating examples of processing procedures according to the third exemplary embodiment. The same operations as operations in the first exemplary embodiment will be assigned the same reference numerals as in FIG. 6, and will not be described. In the following description, for ease of description, the amount of sensor data and the amount of sensor data which can be processed by the flow line detection unit is referred to as the "number of items of sensor data".

The operations in steps S1 to S6 are the same as operations in steps S1 to S6 in the first exemplary embodiment. After step S6, the correlation graph division means 224 decides whether or not a graph obtained at this point of time satisfies the graph division end condition (step S71). In step S71, the correlation graph division means 224 decides whether or not the obtained graph satisfies a first graph division end condition or whether or not the obtained graph satisfies a second graph division end condition, and, when at least one of the conditions is satisfied, finishes dividing the graph of this graph. Meanwhile, although the first end condition is that, for example, the sum of the numbers of pieces of trajectory information detected from each node (in other words, unit areas) included in one graph is a threshold or less, the first end condition may be other than this condition. Further, the second condition is that a graph corresponds to a graph which includes only one node which is not connected with another node by a link.

When a graph which satisfies neither the first condition nor the second condition, the correlation graph division means 224 deletes a link of the lowest degree of correlation from this graph (step S8), and returns to step S71. In steps S71 and S8, repetition processing is performed until the end condition is satisfied similar to steps S7 and S8 in the first exemplary embodiment.

When the graph division end condition is satisfied (Yes in step S71), the divided area determination means 225 divides a trace area 50 (see FIG. 1) into divided areas associated with the divided graphs based on the individual divided graphs (step S9). This processing is the same as processing in step S9 according to the first exemplary embodiment.

Subsequently, the data distribution means 23 classifies the sensor data (the trajectory information and the mobile body ID information of a past certain period of time from the current time) updated in step S2 based on the divided areas determined by the divided area determination means 225 (step S11). Meanwhile, in the third exemplary embodiment, the data distribution means 23 inputs a group of items of sensor data classified per divided area to the data amount reduction means 26.

The data amount reduction means 26 decides whether or not the number of items of sensor data belonging to the group is the amount (number) which can be processed by the flow line detection unit 3 to which the sensor data of this group is scheduled to be inputted per group of the sensor data classified per divided area. Further, the data amount reduction means 26 decides for all groups whether or not the numbers of items of sensor data are the amount (number) which can be processed by the corresponding flow line detection units 3 (step S12).

When the number of items of sensor data in one of groups exceeds the amount which can be processed by the corresponding flow line detection unit 3 (No in step S12), the data amount reduction means 26 deletes sensor data of the oldest detection time from sensor data of this group (step S13), and returns to step S12.

In addition, in this case, although sensor data of a group the number of items of sensor data of which exceeds the amount which can be processed by the corresponding flow line detection unit 3 is deleted in order of the older detection times by repeating steps S12 and S13, deletion of sensor data may be determined according to another criterion in step S13.

When the number of items of sensor data of each group of sensor data classified per divided area becomes the amount which can be processed by the corresponding flow line detection unit 3 (Yes in step S12), the data reduction means 26 outputs the sensor data of each group to the corresponding flow line detection unit 3 per group (step S14).

Each flow line detection unit 3 which receives an input of sensor data performs flow line detection processing using this sensor data.

According to the present exemplary embodiment, even when sensor data concentrates on and is detected in a partial area in the trace area 50 (see FIG. 1), if the data amount of each group of sensor data classified based on the divided areas exceeds the sensor data amount which can be processed by the flow line detection unit 3 to which this group is scheduled to be inputted, the sensor data is reduced. Consequently, it is possible to prevent an increase in a load of flow line detection processing of the flow line detection unit 3.

Further, the third exemplary embodiment may be applied to the above-described second exemplary embodiment.

Figure 21:
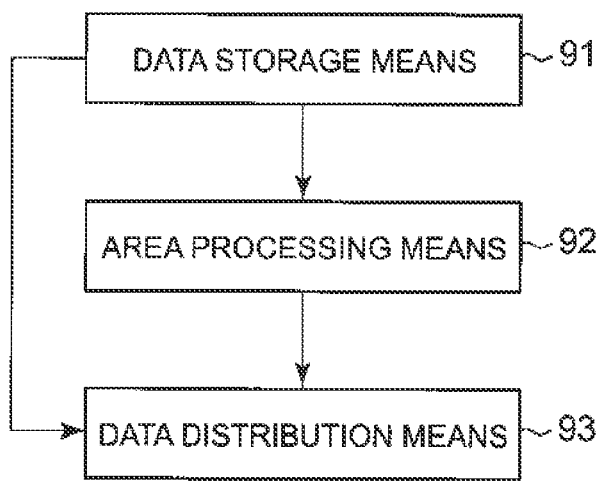
[FIG. 21] It depicts an explanatory view illustrating an example of a minimum configuration of the present invention.
Figure 22:
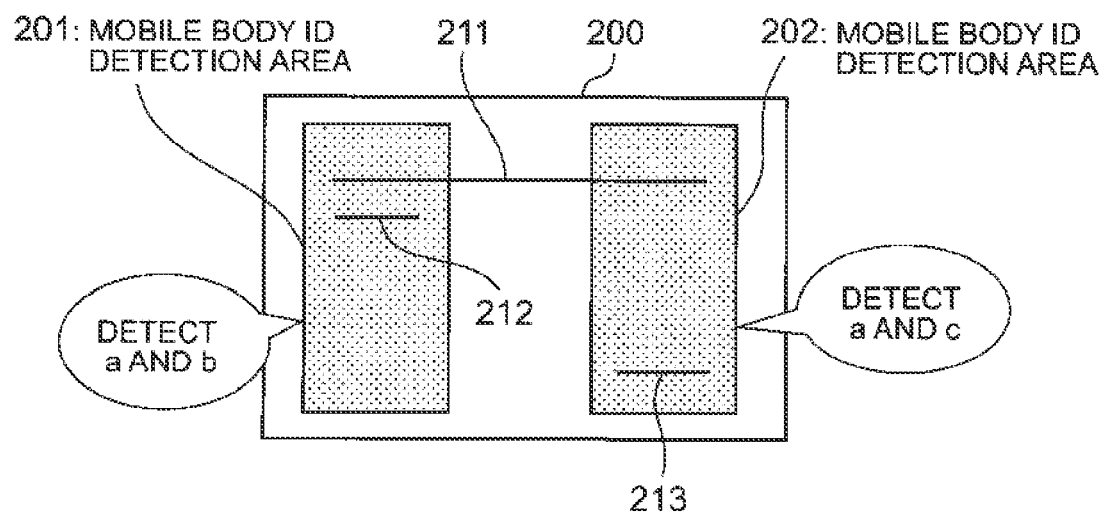
[FIG. 22] It depicts a schematic view illustrating an example of an ID and a trajectory of a mobile body detected in a trace area.
Figure 23:
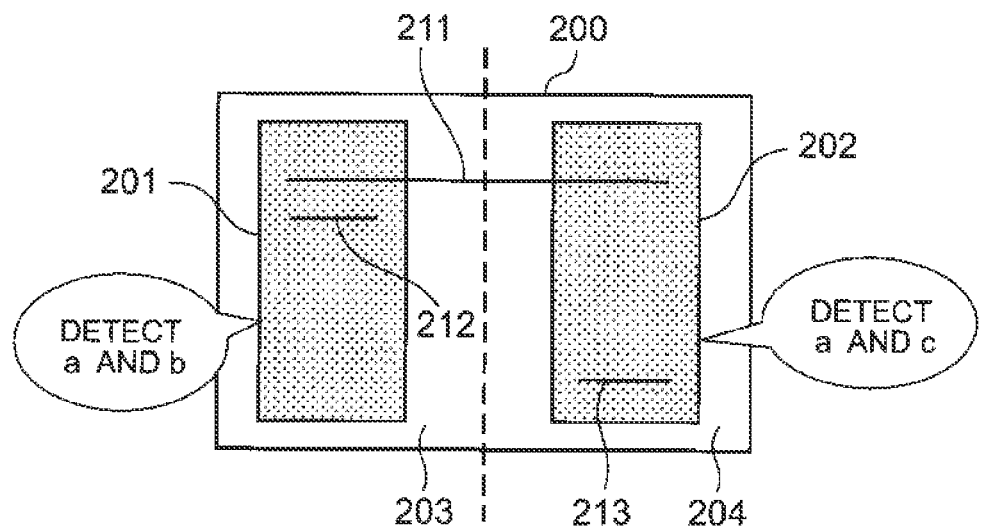
[FIG. 23] It depicts a schematic view illustrating how to distribute detected data.
Figure 24:
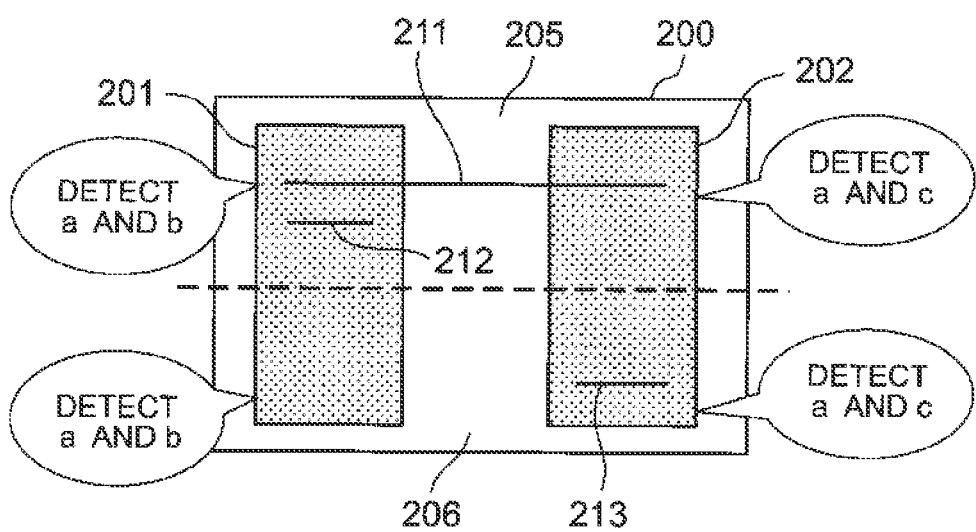
[FIG. 24] It depicts a schematic view illustrating how to distribute detected data.

Next, a minimum configuration of the present invention will be described. FIG. 21 depicts an explanatory view illustrating an example of the minimum configuration of the present invention. A flow line detection process data distribution system according to the present invention has a data storage means 91, an area processing means 92 and a data distribution means 93.

The data storage means 91 (for example, the data hold means 21) stores sensor data of a past certain period of time since an input of latest sensor data among sensor data which is data detected in a predetermined area (for example, the trace area 50) in which a mobile body moves and related to a mobile body.

The area processing means 92 (for example, the division rule application means 22 and 22b) calculates for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determines the divided areas obtained by dividing the predetermined area based on the calculated degree of correlation.

The data distribution means 93 (for example, the data distribution means 23 and 23b) classifies the sensor data stored in the data storage means 91 depending on in which divided area the sensor data is detected, and outputs the classified sensor data to different flow line detection process units.

According to the above configuration, it is possible to distribute data detected from a mobile body to precisely perform flow line detection when flow line detection is realized by distribution processing.

Further, a configuration may be employed which has a divided area storage means (for example, the divided area storage unit 25) which stores information which represents the divided area determined by the area processing means 92 and a time at which processing of determining the divided area is performed; and a divided area determination control means (for example, the divided area determination control means 24) which commands the area processing means 92 to determine a divided area again under a condition that a predetermined time or more passes from a previous time at which the processing of determining the divided area is performed, and the area processing means 92 determines the divided area according to the command from the divided area determination control means and stores information which indicates the determined divided area and the time at which the processing of determining the divided area, in the divided area storage means.

A configuration may be employed in which the area processing means 92 has: an environment information storage means (for example, the environment information storage unit 226) which stores information which indicates an arrangement position of a mobile body ID detection apparatus (for example, the mobile body ID information detection apparatus) which detects a mobile body ID as sensor data, and information which indicates a range of a predetermined area in which the mobile body moves; a unit area determination means (for example, the unit area determination means 221) which determines a unit area such that a condition that at least one mobile body ID detection apparatus exists in one unit area, based on the information which indicates the arrangement position of the mobile body ID detection apparatus and the information which indicates the range of the predetermined area; a correlation degree calculation means (for example, the correlation degree calculation means 222) which calculates a degree of correlation for each combination obtained by combining two different unit areas; a graph creation means (for example, the correlation graph creation means 223) which creates a graph by using unit areas a nodes, connecting different nodes by a link and assigning to each link the degree of correlation calculated for a combination of unit areas represented by nodes at both ends of a link; a graph division means (for example, the correlation graph division means 224) which divides the graph created by the graph creation means by deleting links in the graph created by the graph creation means in order of lower degrees of correlation until a predetermined graph division end condition is satisfied; and a divided area determination means (for example, the divided area determination means 225) which determines a divided area obtained by dividing a predetermined area based on the individual graphs divided from the graph created by the graph creation means.

Further, a configuration may be employed in which the area processing means 92 has: an environment information storage means (for example, the environment information storage unit 226) which stores information which indicates each unit area determined in advance; a correlation degree calculation means (for example, the correlation degree calculation means 222) which calculates a degree of correlation for each combination obtained by combining two different unit areas; a graph creation means (for example, the correlation graph creation means 223) which creates a graph by using unit areas a nodes, connecting different nodes by a link and assigning to each link the degree of correlation calculated for a combination of unit areas represented by nodes at both ends of a link; a graph division means (for example, the correlation graph division means 224) which divides the graph created by the graph creation means by deleting links in the graph created by the graph creation means in order of lower degrees of correlation until a predetermined graph division end condition is satisfied; and a divided area determination means (for example, the divided area determination means 225) which determines a divided area obtained by dividing a predetermined area based on the individual graphs divided from the graph created by the graph creation means.

Further, a configuration may be employed which has a data amount reduction means (for example, the data amount reduction means 26) which reduces sensor data of a group the sensor data amount of which exceeds an amount which can be processed by the flow line detection process unit which is an output destination of the sensor data among groups of the sensor data classified by the data distribution means 93.

Part or the entirety of the above exemplary embodiments can be described as in the following Supplementary notes and, however, is by no means limited to the following Supplementary notes.

(Supplementary note 1) A flow line detection process data distribution system has: a data storage unit which stores sensor data of a past certain period of time since an input of latest sensor data among sensor data which is data detected in a predetermined area in which a mobile body moves and related to a mobile body; an area processing unit which calculates for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determines the divided areas obtained by dividing the predetermined area based on the calculated degree of correlation; and a data distribution unit which classifies the sensor data stored in the data storage unit depending on in which divided area the sensor data is detected, and outputs the classified sensor data to different flow line detection process units.

(Supplementary note 2) The flow line detection process data distribution system described in Supplementary note 1 has: a divided area storage unit which stores information which represents the divided area determined by the area processing unit and a time at which processing of determining the divided area is performed; and a divided area determination control unit which commands the area processing unit to determine again a divided area under a condition that a predetermined time or more passes from a previous time at which the processing of determining the divided area is performed, and the area processing unit determines the divided area according to the command of the divided area determination control unit, and has the divided area storage unit store the information which represents the determined divided area and the time at which the processing of determining the divided area is performed.

(Supplementary note 3) In the flow line detection process data distribution system described in Supplementary note 1 or 2, the area processing unit has: an environment information storage unit which stores information which indicates an arrangement position of a mobile body ID detection apparatus which detects an ID of the mobile body as sensor data, and information which indicates a range of the predetermined area in which the mobile body moves; a unit area determination unit which determines a unit area which satisfies a condition that at least one mobile body ID detection apparatus exists in one unit area, based on the information which indicates the arrangement position of the mobile body ID detection apparatus and the information which indicates the range of the predetermined area; a correlation degree calculation unit which calculates the degree of correlation for each combination obtained by combining the two different unit areas; a graph creation unit which creates a graph by using unit areas as nodes, connecting different nodes by a link and assigning to each link the degree of correlation calculated for a combination of unit areas represented by nodes at both ends of each link; a graph division unit which divides the graph created by the graph creation unit by deleting links in the graph created by the graph creation unit in order of small degrees of correlation until a predetermined graph division end condition is satisfied; and a divided area determination unit which determines divided areas obtained by dividing the predetermined area based on individual graphs divided from the graph created by the graph creation unit.

(Supplementary note 4) In the flow line detection process data distribution system described in Supplementary note 1 or 2, the area processing unit has: an environment information storage unit which stores information which indicates each unit area determined in advance; a correlation degree calculation unit which calculates the degree of correlation for each combination obtained by combining the two different unit areas; a graph creation unit which creates a graph by using unit areas as nodes, connecting different nodes by a link and assigning to each link the degree of correlation calculated for a combination of unit areas represented by nodes at both ends of each link; a graph division unit which divides the graph created by the graph creation unit by deleting links in the graph created by the graph creation unit in order of small degrees of correlation until a predetermined graph division end condition is satisfied; and a divided area determination unit which determines divided areas obtained by dividing the predetermined area based on individual graphs divided from the graph created by the graph creation unit.

(Supplementary note 5) The flow line detection process data distribution system described in any one of Supplementary notes 1 to 4, further has a data amount reduction unit which reduces sensor data of a group an amount of sensor data of which exceeds an amount which can be processed by the flow line detection process unit which is an output destination of the sensor data among groups of the sensor data classified by the data distribution unit.

This application claims priority to Japanese Patent Application No. 2011-009836 field on Jan. 20, 2011, the entire contents of which are incorporated by reference herein.

Although the present invention has been described above with reference to the exemplary embodiments, the present invention is by no means limited to the above exemplary embodiments. The configurations and the details of the present invention can be variously changed within a scope of the present invention which one of ordinary skill in art can understand.

INDUSTRIAL APPLICABILITY

The present invention is suitably applied to a flow line detection process data distribution system which, when a plurality of calculators performs parallel distribution process of flow line detection process, distributes data used for the flow line detection process to each calculator.

REFERENCE SIGNS LIST

1 Data input unit
2 Flow line detection process data distribution unit
3 Flow line detection unit
21 Data hold means
22 Division rule application means
23 Data distribution means
221 Unit area determination means
222 Correlation degree calculation means
223 Correlation graph creation means
224 Correlation graph division means
225 Divided area determination means
226 Environment information storage unit

The invention claimed is:

1. A flow line detection process data distribution system for distributing data detected from a mobile body, comprising:
a data storage unit implemented by a processor and which stores sensor data of a past certain period of time since an input of latest sensor data among sensor data which is data detected in a predetermined area in which the mobile body moves and related to the mobile body;
an area processing unit implemented by the processor and which calculates for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determines the divided areas obtained by dividing the predetermined area based on the calculated degree of correlation; and
a data distribution unit implemented by the processor and which classifies the sensor data stored in the data storage unit depending on in which divided area the sensor data is detected, and outputs the classified sensor data to different flow line detection process units.

2. The flow line detection process data distribution system according to claim 1, further comprising:
a divided area storage unit implemented by a storage apparatus and which stores information which represents the divided area determined by the area processing unit and a time at which processing of determining the divided area is performed; and
a divided area determination control unit implemented by the processor and which commands the area processing unit to determine again a divided area under a condition that a predetermined time or more passes from a previous time at which the processing of determining the divided area is performed,
wherein the area processing unit determines the divided area according to the command of the divided area determination control unit, and has the divided area storage unit store the information which represents the determined divided area and the time at which the processing of determining the divided area is performed.

3. The flow line detection process data distribution system according to claim 1, wherein the area processing unit comprises:
an environment information storage unit implemented by a storage apparatus and which stores information which indicates an arrangement position of a mobile body ID detection apparatus which detects an ID of the mobile body as sensor data, and information which indicates a range of the predetermined area in which the mobile body moves;
a unit area determination unit implemented by the processor and which determines a unit area which satisfies a condition that at least one mobile body ID detection apparatus exists in one unit area, based on the information which indicates the arrangement position of the mobile body ID detection apparatus and the information which indicates the range of the predetermined area;
a correlation degree calculation unit implemented by the processor and which calculates the degree of correlation for each combination obtained by combining the two different unit areas;
a graph creation unit implemented by the processor and which creates a graph by using unit areas as nodes, connecting different nodes by a link and assigning to each link the degree of correlation calculated for a combination of unit areas represented by nodes at both ends of each link;
a graph division unit implemented by the processor and which divides the graph created by the graph creation unit by deleting links in the graph created by the graph creation unit in order of small degrees of correlation until a predetermined graph division end condition is satisfied; and
a divided area determination unit implemented by the processor and which determines divided areas obtained by dividing the predetermined area based on individual graphs divided from the graph created by the graph creation unit.

4. The flow line detection process data distribution system according to claim 1, wherein the area processing unit comprises:
- an environment information storage unit implemented by a storage apparatus and which stores information which indicates each unit area determined in advance;
- a correlation degree calculation unit implemented by the processor and which calculates the degree of correlation for each combination obtained by combining the two different unit areas;
- a graph creation unit implemented by the processor and which creates a graph by using unit areas as nodes, connecting different nodes by a link and assigning to each link the degree of correlation calculated for a combination of unit areas represented by nodes at both ends of each link;
- a graph division unit implemented by the processor and which divides the graph created by the graph creation unit by deleting links in the graph created by the graph creation unit in order of small degrees of correlation until a predetermined graph division end condition is satisfied; and
- a divided area determination unit implemented by the processor and which determines divided areas obtained by dividing the predetermined area based on individual graphs divided from the graph created by the graph creation unit.

5. The flow line detection process data distribution system according to claim 1, further comprising a data amount reduction unit implemented by the processor and which reduces sensor data of a group an amount of sensor data of which exceeds an amount which can be processed by the flow line detection process unit which is an output destination of the sensor data among groups of the sensor data classified by the data distribution unit.

6. A flow line detection process data distribution method comprising:
- at a data storage unit implemented by a processor, storing sensor data of a past certain period of time since an input of latest sensor data among sensor data which is data detected in a predetermined area in which a mobile body moves and related to the mobile body;
- at an area processing unit implemented by the processor, calculating for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determining the divided areas obtained by dividing the predetermined area based on the calculated degree of correlation; and
- at a data distribution unit implemented by the processor, classifying the sensor data stored in the data storage unit depending on in which divided area the sensor data is detected, and outputting the classified sensor data to different flow line detection process units.

7. The flow line detection process data distribution method according to claim 6,
- wherein a divided area determination control unit implemented by the processor commands the area processing unit to determine again a divided area under a condition that a predetermined time or more passes from a previous time at which the processing of determining the divided area is performed, and
- the area processing unit determines the divided area according to the command of the divided area determination control unit, and has the divided area storage unit store the information which represents the determined divided area and the time at which the processing of determining the divided area is performed.

8. A non-transitory computer-readable recording medium in which a flow line detection process data distribution program is recorded, the flow line detection process data distribution program causing a computer to execute:
- data storage processing for storing sensor data of a past certain period of time since an input of latest sensor data among sensor data which is data detected in a predetermined area in which a mobile body moves and related to the mobile body;
- area processing for calculating for each combination which is a combination of unit areas used as constituent units of divided areas upon determination of the divided areas obtained by dividing the predetermined area and which is obtained by combining two different unit areas a degree of correlation which indicates a degree that sensor data related to an identical mobile body is detected, and determining the divided areas obtained by dividing the predetermined area based on the calculated degree of correlation; and
- data distribution processing for classifying the sensor data stored in the data storage processing depending on in which divided area the sensor data is detected, and outputting the classified sensor data to different flow line detection process units.

9. The non-transitory computer-readable recording medium in which the flow line detection process data distribution program is recorded, according to claim 8, the flow line detection process data distribution program further causing a computer which comprises a divided area storage unit which stores information which represents the divided area determined by the area processing and a time at which processing of determining the divided area is performed to:
- execute divided area determination control processing of generating a command of determining again a divided area under a condition that a predetermined time or more passes from a previous time at which the processing of determining the divided area is performed; and
- execute the area processing when the command is generated, and store information which represents the determined divided area and a time at which the processing of determining the divided area is performed, in the divided area storage unit.

* * * * *